United States Patent [19]

Honjo et al.

[11] Patent Number: 4,667,951

[45] Date of Patent: May 26, 1987

[54] ORIGINAL FEEDING APPARATUS

[75] Inventors: Takeshi Honjo, Kawasaki; Naomi Takahata, Yokohama; Mamoru Tanaka; Yoshihito Umeda, both of Yamanashi, all of Japan

[73] Assignee: Canon Kabushiki Kaisha, Tokyo, Japan

[21] Appl. No.: 880,112

[22] Filed: Jun. 30, 1986

Related U.S. Application Data

[63] Continuation of Ser. No. 643,238, Aug. 22, 1984, abandoned.

[30] Foreign Application Priority Data

Aug. 23, 1983 [JP] Japan .............................. 58-153781
Oct. 13, 1983 [JP] Japan .............................. 58-191462

[51] Int. Cl.4 ............................................. B65H 7/14
[52] U.S. Cl. .................................. 271/259; 271/3.1; 271/199; 271/202; 271/265; 271/270; 271/275; 271/291; 271/301; 271/304; 271/902

[58] Field of Search ................. 271/3.1, 902, 202, 225, 271/227, 258, 259, 251, 301, 304, 3.4, 275, 199, 265, 270, 197

[56] References Cited

U.S. PATENT DOCUMENTS 3,698,706 10/1972 Mihojevich et al. ........... 271/197 X
4,455,018 6/1984 Colglazier et al. ................. 271/265

Primary Examiner—Richard A. Schacher
Attorney, Agent, or Firm—Fitzpatrick, Cella, Harper & Scinto

[57] ABSTRACT

An original feeding apparatus for single or both side original copy has belts and rollers to carry an original to an exposure position a glass platen, motors for driving the belts and rollers, an electromagnetic brake and a drive control circuit to apply electromagnetic and electric brake forces on the motors, and a $\mu$-COM to control the operation of the apparatus. The original can be stopped at the exposure position with high position, and both side original copy can be automatically performed without requiring the user to rearrange the originals after the copy operation.

16 Claims, 26 Drawing Figures

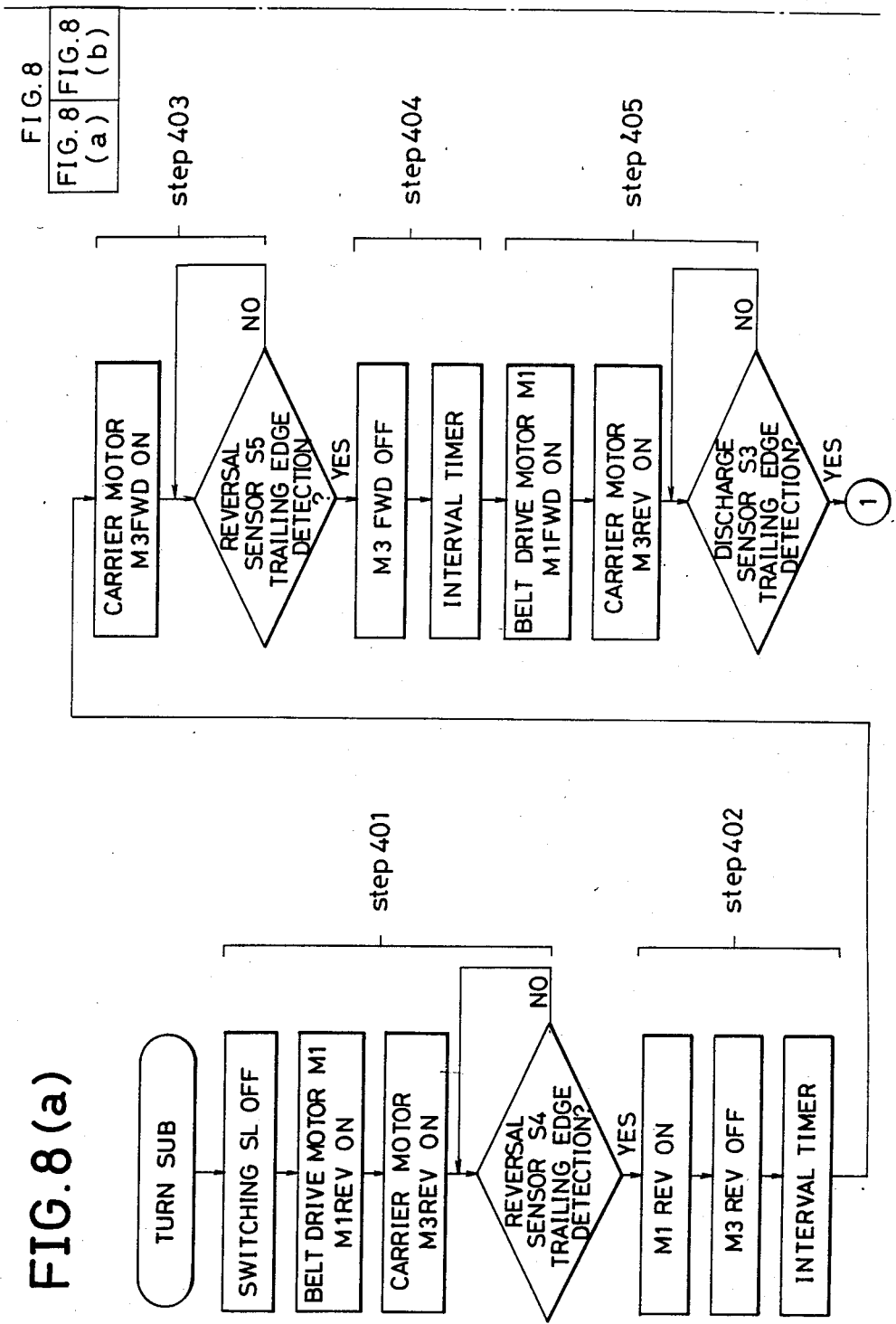

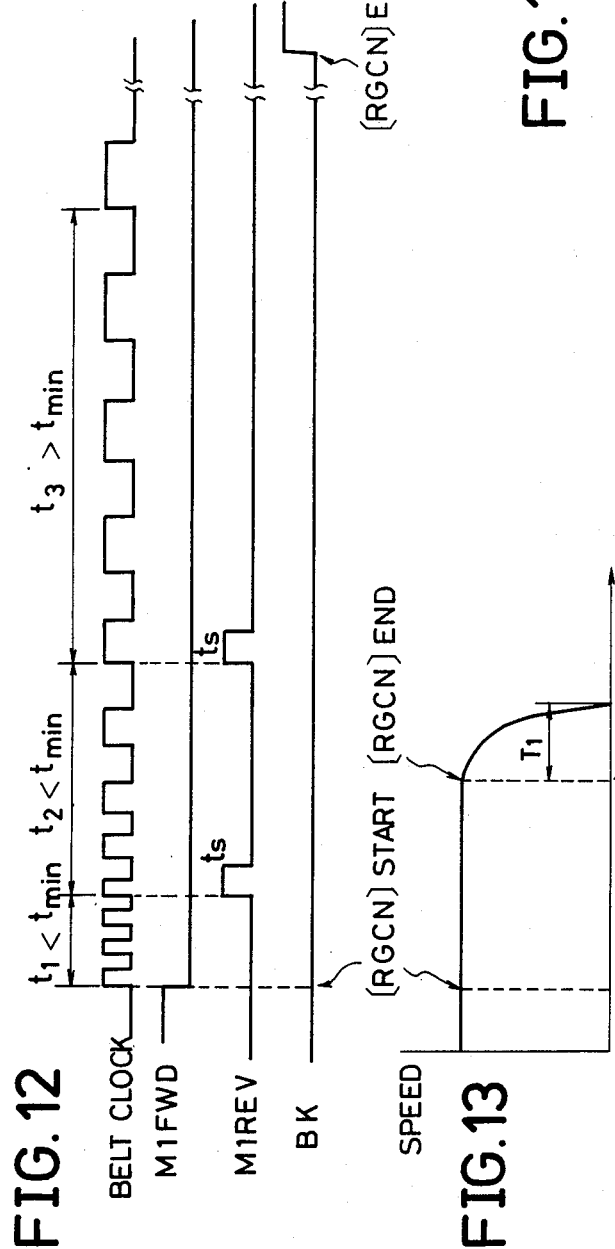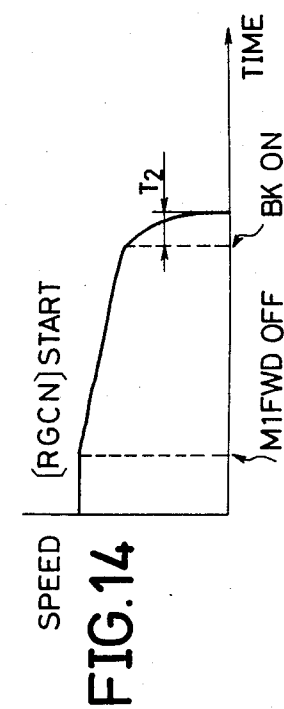

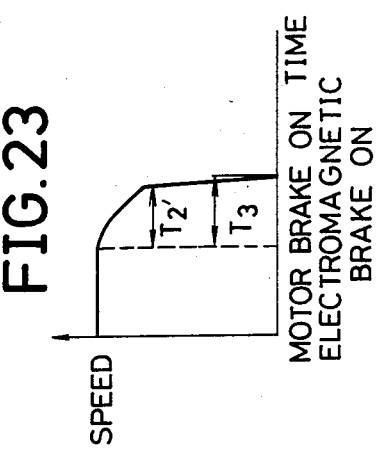
FIG.21
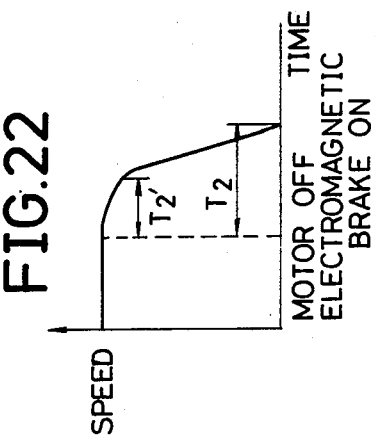
FIG.22
FIG.23
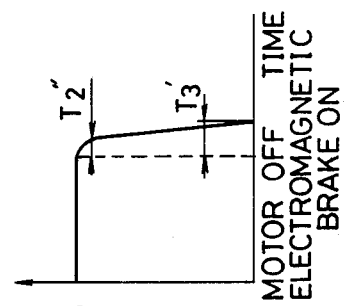
FIG.26
FIG.25
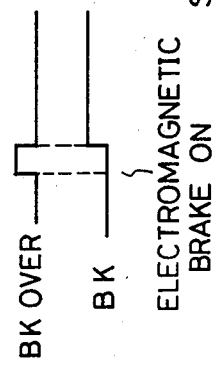
FIG.24
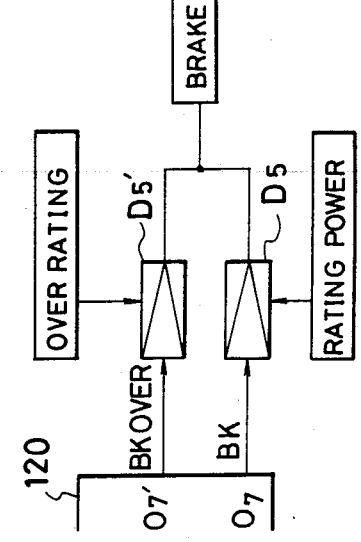

ORIGINAL FEEDING APPARATUS

This application is a continuation of application Ser. No. 643,238 filed Aug. 22, 1984, now abandoned.

BACKGROUND OF THE INVENTION

1. Field of the Invention

The present invention relates to an original feeding apparatus for feeding an original to a predetermined position and stopping the fed original at this position.

2. Description of the Prior Art

An original feeding apparatus is conventionally known wherein an original is sequentially picked up from an original table and carried, is stopped at a predetermined exposure position, and is removed from the exposure position after exposure and returned to the original tray. In an original feeding apparatus of this type, various methods are known for stopping an original at a predetermined position. According to one method, a pawl is projected at a leading edge of an original on a glass platen to allow the leading edge of the original to abut against the pawl. According to another method, the trailing edge of an original on a carry path is detected and the carry operation of the original is terminated a predetermined period of time after the detection of the original.

However, the former method results in a big apparatus. In the latter method, if the carry speed of the original is fast, accuracy of the stop position of the original is poor.

SUMMARY OF THE INVENTION

The present invention has been made in consideration of this and has its object to provide an improved original feeding apparatus.

It is another object of the present invention to provide an original feeding apparatus which has a simple construction and which is capable of stopping an original with good precision.

It is still another object of the present invention to provide an original feeding apparatus which can stop an original at a predetermined position with a good precision even if the carry speed of the original is high.

It is still another object of the present invention to provide an original feeding apparatus which performs stop control of an original by applying both an electrical brake and a magnetic brake on a motor.

It is still another object of the present invention to provide an original feeding apparatus which can perform stop control of an original by actuating a brake after gradual deceleration.

The above and other objects, features and advantages of the present invention will become apparent from the following description taken in conjunction with the accompanying drawings.

BRIEF DESCRIPTION OF THE DRAWINGS

FIG. 12 is a timing chart when a motor is decelerated in the apparatus shown in FIG. 1;

FIGS. 13 to 15 are graphs showing the relationship between the motor speed and the time for original to stop in the apparatus shown in FIG. 1;

FIGS. 21 to 23 and 26 are graphs showing the relationship between the motor speed and the time for original to stop in the apparatus shown in FIG. 16;

FIG. 24 is a diagram showing part of a control section according to still another embodiment of the present invention; and FIG. 25 is a timing chart for practicing the embodiment shown in FIG. 24.

DETAILED DESCRIPTION OF THE PREFERRED EMBODIMENTS

Figure 1:
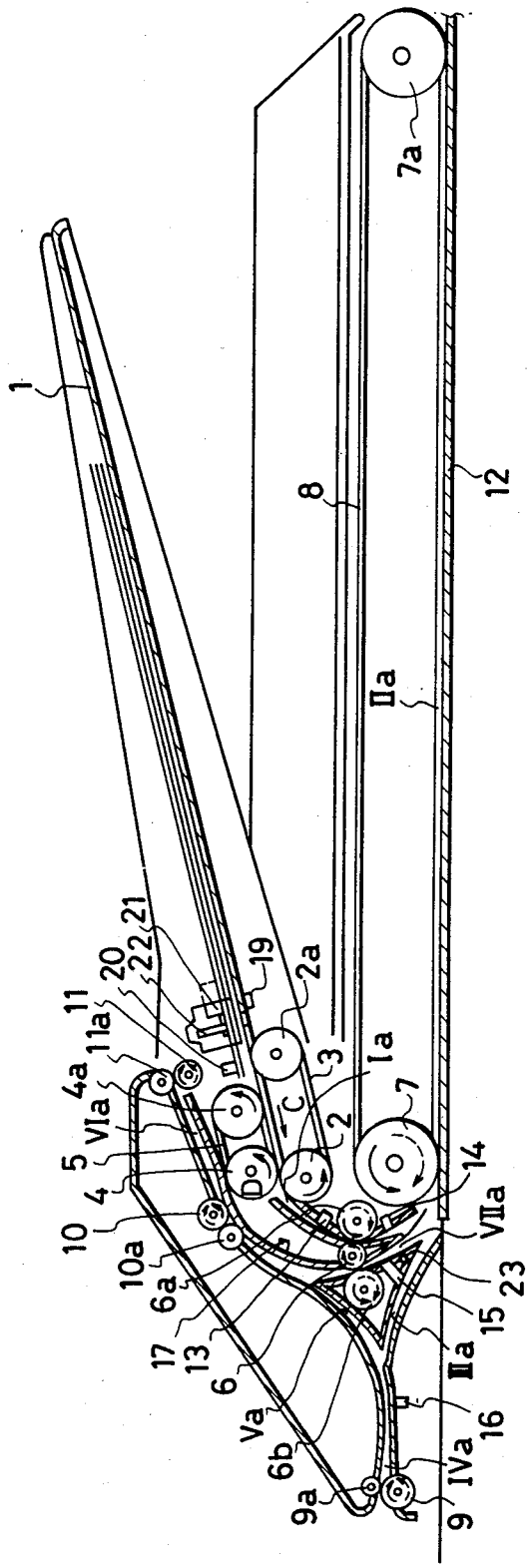
FIG. 1 is a longitudinal sectional view of a both side original feeding apparatus according to an embodiment of the present invention.

The preferred embodiments of the present invention will be described with reference to the accompanying drawings. FIG. 1 is a longitudinal sectional view of a both side original feeding apparatus according to an embodiment of the present invention.

A paper feed belt 3 is looped around a paper feed belt drive shaft 2 and a paper feed belt driven shaft 2a and is rotated in the direction indicated by arrow C. A separation belt 5 is looped around a separation belt drive shaft 4 and a separation belt driven shaft 4a and is rotated in the direction indicated by arrow D. A plurality of stacked originals in the sheet-like form on an original table 1 are separated one by one from the lowermost original by the paper feed belt 3 and the separation belt 5. A pair of carrier rollers 6a and 6b are urged against a carry roller 6 interposed therebetween. Carrier rollers 9a, 10a and 11a are similarly urged against carry rollers 9, 10 and 11. A carry belt drive roller 7 is located on a left end portion of a glass platen 12 arranged on the upper plate of a copier main body. A carry belt driven roller 7a is located on a right end portion of the glass platen 12. A carry belt 8 is looped around the rollers 7 and 7a.

The lower surface of the belt 8 opposes or contacts with the upper surface of the glass platen 12. Reflecting-type photosensors 13 to 17 detect the leading or trailing edge of the original and are arranged at predetermined positions on an original carry path (paper path). A reflecting-type photosensor (ES) 20 detects the original on the original table 1. A reflecting-type sensor (RS; recycle sensor) 19 detects one cycle of the original bundle. When an arm 22 is pivoted and stopped on the original bundle by a pulse motor 21, the recycle sensor (RS) 19 is turned on. Thereafter, the originals are separated from the lowermost one. When the trailing edge of the last original passes through the arm 22, the arm 22 is passed through the position of the recycle sensor (RS) 19 by its own weight and turns it off.

Figure 2:
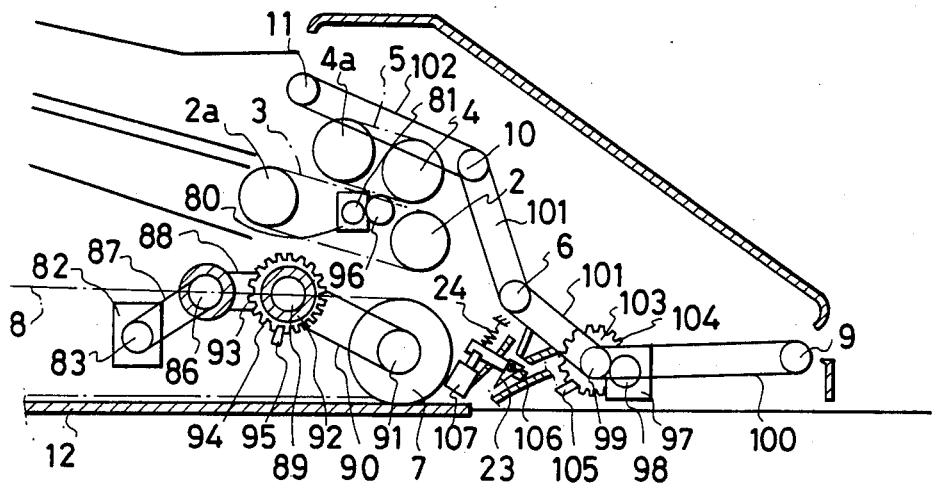
FIG. 2 is a sectional rear view of a drive section of the apparatus shown in FIG. 1.

FIG. 2 is a schematic sectional rear view of a drive section. Force of a belt drive motor (M2) 80 is transmitted to the paper feed belt drive shaft 2 and the separation belt drive shaft 4 through a motor gear 81 and a gear 96. Force of a belt drive motor (M1) 82 is transmitted from a belt 87 to a belt 88 through a motor pulley 83 and a double-stage pulley 86. Drive force is transmitted from the belt 88 to a belt 90 through another double-stage pulley 89, so that the drive force is constantly transmitted to the drive roller 7 through a pulley 91. A disk 93 has notched grooves 94 and is driven together with the double-stage pulley 89. A photo-electric sensor (BC) 95 can detect the amount of displacement of the belt 8. An electromagnetic brake (BK) 92 can instantaneously stop the belt 8 upon being turned on.

Drive force of a carrier motor (M3) 97 is transmitted to the carry rollers 6, 9, 10 and 11 through a gear 98, a pulley 99 and belts 100, 101 and 102. A disk 103 has notched grooves 104 and is rotated together with the pulley 99. A photo-electric sensor (FC) 105 can detect the amount of rotation of the carry rollers 6, 9, 10 and 11, that is, detect the carry amount of the original. A switching pawl 23 switches by means of a tension spring 24 and a switching solenoid (SL) 107 between the carry of the original on the glass platen 12 toward the carry roller 6 or toward the carry roller 9 at a pivot point 106.

The mode of operation of the both side original feeding apparatus will be described below.

(i) Single side original copy

A plurality of sheet-like single side originals are stacked in a sequential order on the original table 1 shown in FIG. 1, with page 1 facing upward. The originals are separated from the lowermost original by the paper feed belt 3 and the separation belt 5. The fed original is passed through a paper path Ia and is fed onto the glass platen 12 by the carry belt 8 with the image surface facing downward. When the trailing edge of the original is detected by the sensor (S2) 14, the number of notched grooves 94 of the disk 93 (FIG. 2) begins to be counted. At the same time, the drive speed of the motor (M1) 82 is decelerated gradually. After a predetermined number of notched grooves 94 have been counted, the motor (M1) 82 now rotating at a low speed is turned off, the electromagnetic brake (BK) 92 is turned on, and the drive of the carry belt 8 is stopped immediately. Then, the original is automatically positioned and set at a predetermined position on the glass platen 12.

When the original is positioned on the glass platen 12 in this manner, the copy operation is started, the exposure scanning operation is performed, and the copied sheet is stored in an ejection tray (not shown). The original after exposure is ejected through paper paths VIIa and VIa. At the same time, the next original is fed parallel to the previous original in the same manner, and is positioned onto the first original on the glass platen 12.

This parallel feed operation is performed to recycle the original. Since turning over of the original is performed for neither of the previous and next originals in the parallel feed operation, this feed operation is called obverse ejection-obverse feed operation. The obverse ejection-obverse feed operation is sequentially performed and one cycle of the set originals is detected by the recycle sensor (RS) 19. An end of the recycle is signalled to the copier main body, and the number of originals is counted. The above-mentioned operation is repeated until the number of set originals reaches a predetermined number. Thus, a predetermined number of copies are ejected to the eject tray (not shown) of the copier.

(ii) Both side original copy

Figure 3:
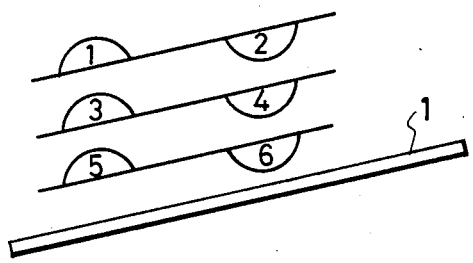
FIG. 3 is a side view of a state wherein an original is placed in the apparatus shown in FIG. 1.

When 3 originals are assumed to be placed on the original table 1, the originals placed on the original table 1 are in the order of pages as shown in FIG. 3. After the copy operations are completed, the originals are also set as in the initial order shown in FIG. 3. This operation is explained below.

First, the original of pages 5 and 6 is carried onto the glass platen 12. Thereafter, the motors (M1) 82 and (M3) 97 are reversed (FIG. 2), and at the same time the solenoid (SL) 107 is turned off to switch the ejection route. The original is passed in paper paths IIIa and IVa, and carried between the rollers 9 and 9a. When the reversal sensor (S4) 16 detects the trailing edge of the original, the motor (M3) 97 is stopped. After a predetermined period of time, the motor (M3) 97 is driven in the forward direction, so that the original is passed in paper paths Va and VIa and carried by the rollers 10, 10a, 11 and 11a. When the sensor reversal (S5) 17 detects the trailing edge of the original, the motor (M3) 97 is stopped. After a predetermined period of time, the motor (M3) 97 is reversed again, the motor (M1) 82 is driven in the forward direction, and the solenoid (SL) 107 is turned on. The original is passed in the paper path VIIa and is carried by the belt 8. When the trailing edge of the original is detected by the sensor (S3) 15, the number of notched grooves 94 of the disk 93 (FIG. 2) starts to be counted. At the same time, the drive speed of the motor (M1) 82 is decelerated gradually. When a predetermined number of notched grooves 94 have been counted, the motor (M1) 82 is turned off. The electromagnetic brake (BK) 92 is turned on, the drive operation of the carry belt 8 is stopped immediately, and the original is set. The operation wherein the original on the original table 1 is set after being reversed i.e., the reverse feed operation is performed first.

The copier main body starts the copy operation of the image of page 6. The exposure for this image is performed, and the copied sheet is stored in the ejection tray (not shown). The original of pages 5 and 6 after the exposure of page 6 is subjected to the refeed operation through the paper paths IIIa, IVa, VIa, and VIIa so as to set the original with page 5 facing the glass platen 12.

Thereafter, the copier main body starts the copy operation of page 5 and stores the copied sheet into the ejection tray (not shown).

After the exposure for page 5, the original on the glass platen 12 is ejected on top of the originals on the original table 1 with page 5 facing upward by the rollers 11 and 11a via the paper paths VIIa and VIa (to be referred to as obverse ejection operation hereinafter). At a predetermined timing during the obverse ejection operation, the above-described reverse feed operation of the next originals of pages 3 and 4 starts to be performed parallel to the above-mentioned obverse ejection operation. The original of pages 3 and 4 is positioned and set on the glass platen 12 with page 4 facing downward (the operation for performing the obverse ejection operation of the previous original and the reverse feed operation of the next original parallel to each other will be referred to as the obverse ejection-reverse feed operation). Thereafter, the above-described copy operation is performed a plurality of times. The sequence of the copied sheets is adjusted and the sheets are stored on the ejection tray (not shown). The originals are ejected onto the original table 1 in the initial set state, thereby completing both side original copy.

Figure 4:
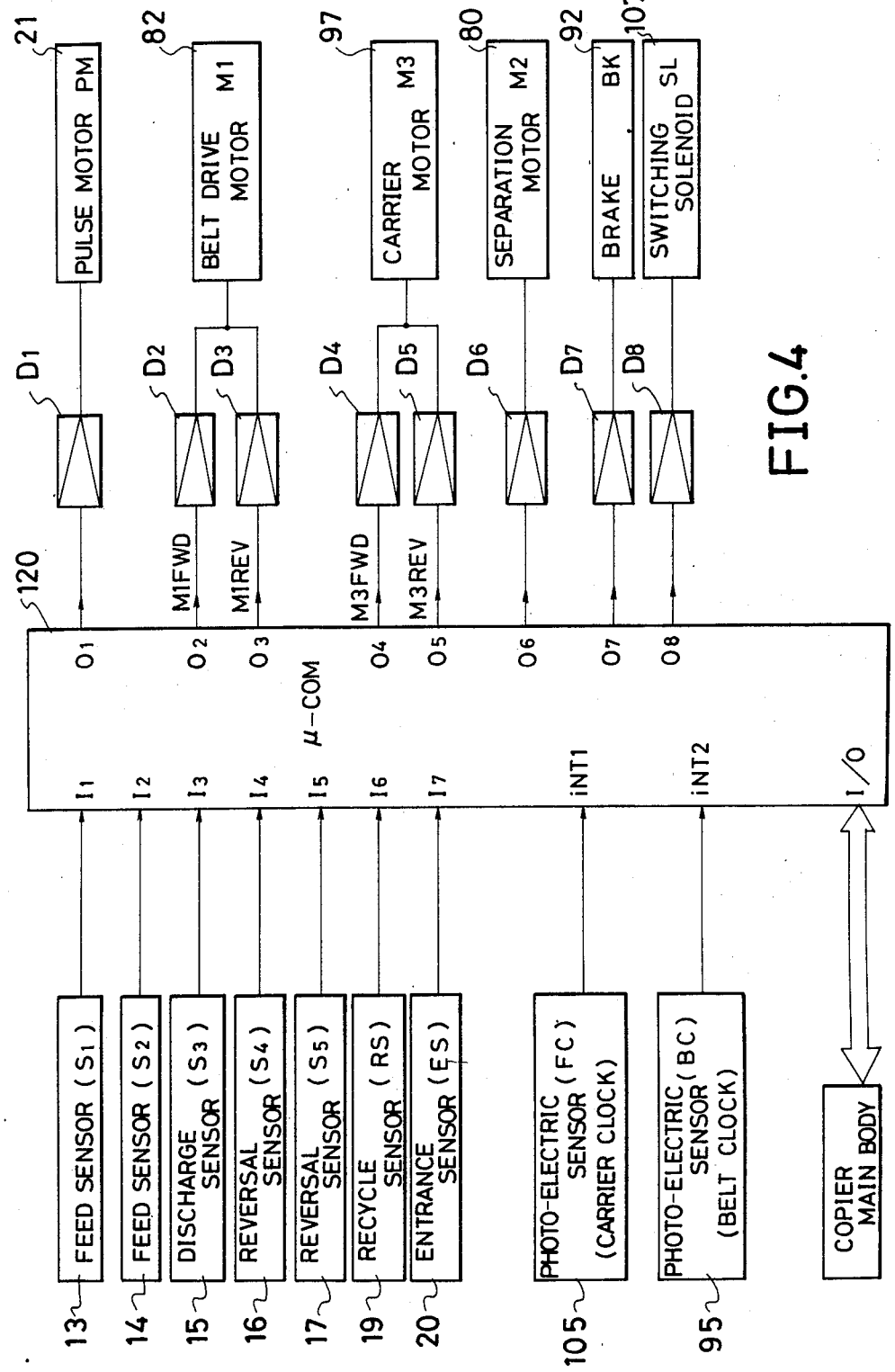
FIG. 4 is a block diagram of a control section of the apparatus shown in FIG. 1.

FIG. 4 is a schematic block diagram of a control section for performing the above sequence operation.

Referring to FIG. 4, a known one-chip microcomputer (to be referred to as μ-COM hereinafter) 120 has a ROM, a RAM, and the like. Input ports I1 to I7 of the μ-COM 120 receive output signals from the respective sensors. Interrupt terminals iNT1 and iNT2 of the μ-COM 120 receive carry clocks from the photo-electric sensor (FC) 105 and belt clock signals from the sensor (BC) 95.

Output ports O1 to O8 are connected to drivers D1 to D8, respectively, to drive respective loads. In particular, the output ports O4 and O5 produce signals M3FWD and M3REV for driving the carry motor (M3) 97 in the forward and reverse directions. Thus, the motor (M3) 97 is driven in the directions of arrows-→and-→shown in FIG. 1. The output ports O2 and O3 produce signals M1FWD and M1REV for driving the belt drive motor (M1) 82 in the forward and reverse directions. Thus, the belt drive motor (M1) 82 can be similarly driven in the directions indicated by arrows-→and-→shown in FIG. 1.

The I/O terminal of the μ-COM 120 is connected to the copier main body to exchange the copy start signal, the original exposure signal, the one cycle (circulation) end signal of the originals and the like so as to match the operation of the both side original feeding apparatus with that of the copier main body. Reading of such input signals or ON/OFF operations of the loads are controlled in accordance with a program stored in the ROM of the μ-COM 120.

The operation of the both side original feeding apparatus (to be referred as an RDF hereinafter) will be described with reference to the general flow chart shown in FIGS. 5 and 6 and the detailed flow chart shown in FIGS. 7 to 10.

Figure 5:
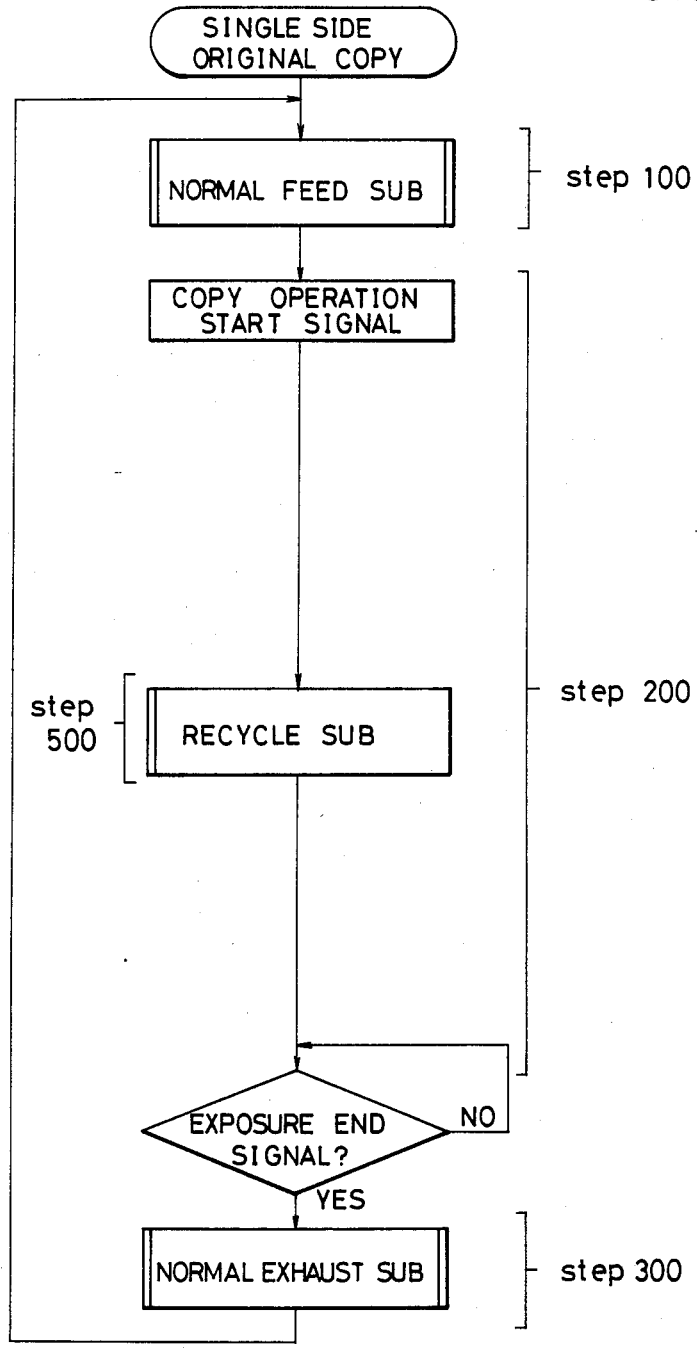
FIG. 5 is a general flow chart for single side original copy in the apparatus shown in FIG. 1.
Figure 6:
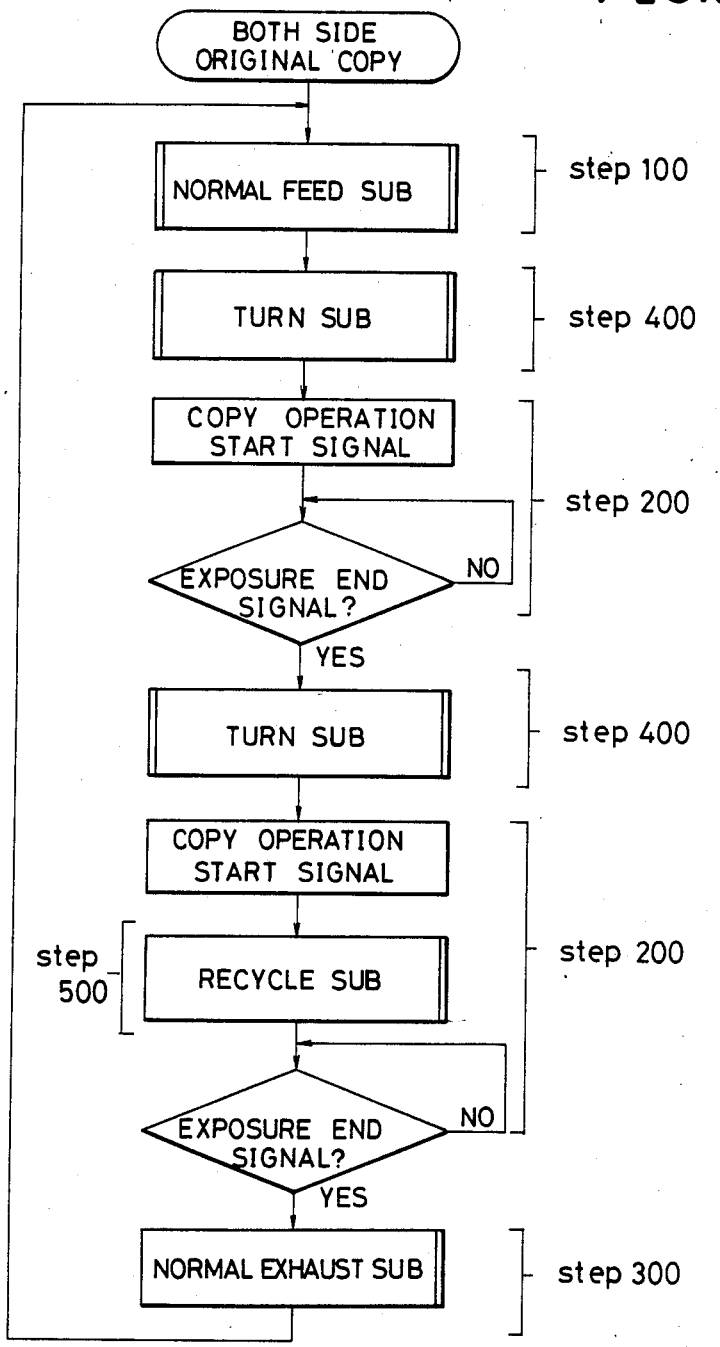
FIG. 6 is a general flow chart for both side original copy in the apparatus shown in FIG. 1.

FIG. 5 shows the general flow chart of the single side original copy operation, and FIG. 6 is the general flow chart of the double side original copy operation. Referring to FIG. 5, the single side original copy operation is performed in the following manner. First, in step 100, the obverse feed subroutine SUB to be described later is executed to separate an original from the original bundle placed on the original table 1. The separated original is passed through carry paths Ia and IIa (FIG. 1) and is stopped at a predetermined position on the glass platen 12. A copy operation start signal is supplied to the copier main body. The copier main body starts the copy operation including the exposure operation. In order to detect one cycle of the original bundle, the RDF executes the recycle subroutine SUB (step 500). The arm 22 is rotated and stopped on the original bundle and awaits until the exposure operation of the copier main body (step 200) is completed. After the exposure operation, the obverse ejection subroutine SUB (step 300) to be described later is executed to superpose the original on the glass platen 12 onto the arm 22 on the original bundle on the original table 1 through the carry paths IIa to VIIa. This operation is repeated. When the arm 22 is dropped by its own weight, an end of one cycle of the originals is signalled to the copier main body in the recycle subroutine SUB (step 500). The RDF operation is terminated. As a result, a set of copied sheets is set in the ejection tray of the copier main body.

Referring to FIG. 6, in the both side original copy, the obverse feed subroutine SUB (step 100) and the refeed operation subroutine SUB (step 400) are executed. The original is passed from the original table 1 through the carry paths Ia, IIa, IIIa, IVa, Va, VIa, VIIa and IIa, and is stopped at the predetermined position on the glass platen 12. At this time, the feed operation is controlled such that the rear surface of the original facing the original table 1 comes to oppose the glass platen 12. In step 200, a copy operation start signal for copying the rear surface image of the original is supplied to the copier main body. After the exposure operation is completed, the refeed operation subroutine SUB (step 400) is executed. The original is fed through the carry paths IIa, IIIa, IVa, Va, VIa, VIIa and IIa, and is stopped at the predetermined position on the glass platen 12. Then, the front surface of the original faces down and on the glass platen 12. In step 200, a copy operation start signal for copying the front surface image is supplied to the copier main body. At the same time, the recycle subroutine SUB for rotating and stopping the arm 22 on the original bundle is executed (step 500). When the exposure operation for this copy operation is ended, the obverse ejection subroutine SUB (step 300) is performed. The original is returned on the arm 22 of the original table 1 in the initial state before the both side circulation. This operation is repeated, and a set of copied sheets is produced after the one cycle is ended.

Figure 7:
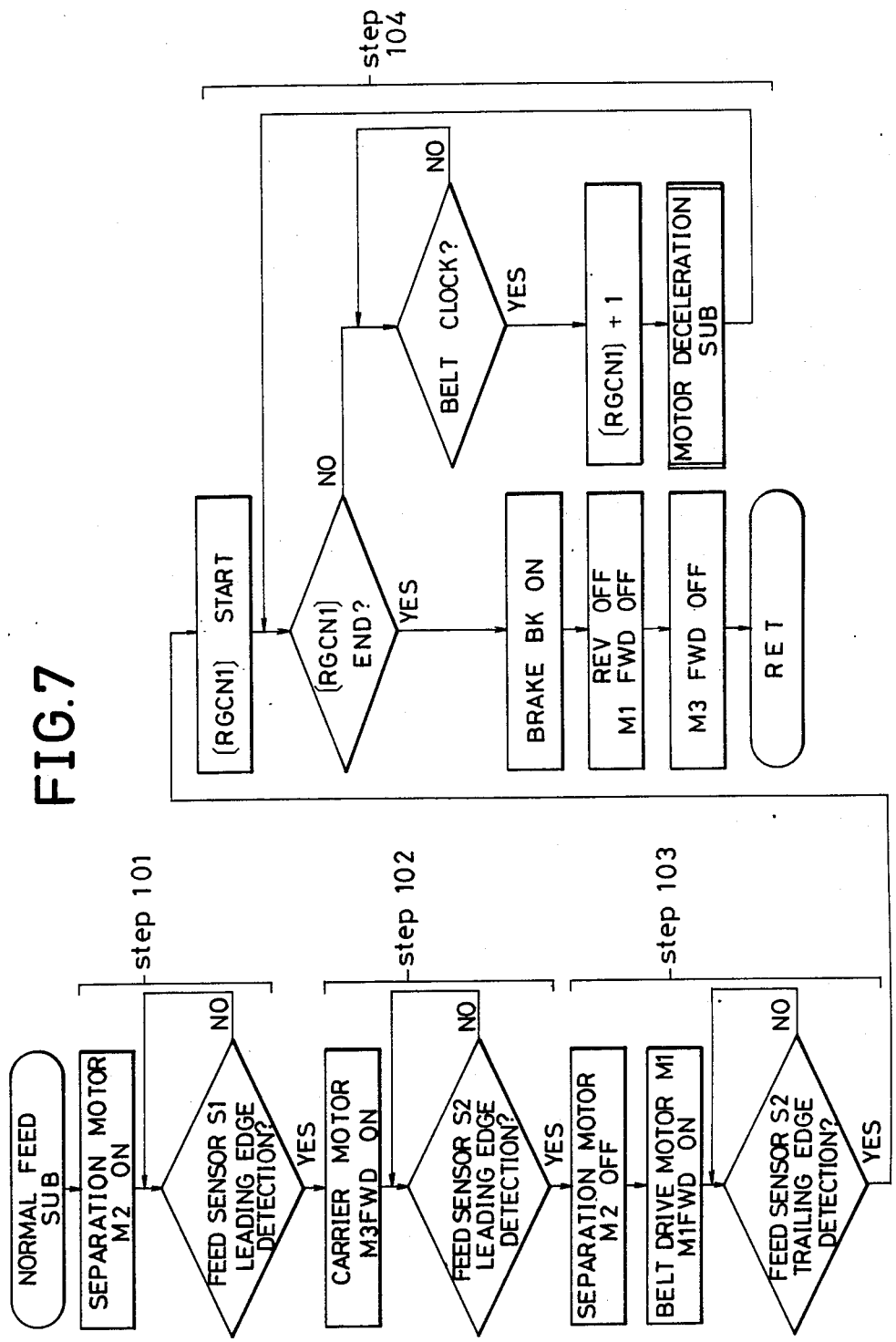
FIGS. 7 to 11 are flow charts showing details of the respective subroutines in the apparatus shown in FIG. 1.

Each subroutine SUB will now be described in detail. Referring to FIG. 7, the obverse feed subroutine SUB is performed in the following manner. First, in order to separate one original from the original bundle on the original table 1, the separation motor (M2) 80 is turned on and it is waited until the leading edge of the original is detected by the paper feed sensor (S1) 13 at the upstream side of the carrier rollers 6 and 6a (step 101). The signal M3FWD for the carry motor (M3) 97 is turned on to rotate the carrier rollers 6 and 6a in the direction indicated by the solid arrow and to feed the separated original to the carry path Ia. It is then waited until the leading edge of the original reaches and is detected by the paper feed sensor (S2) 14 interposed between the carrier rollers 6 and 6a and the belt roller 7 (step 102). When the leading edge of this original is detected, it is determined that the original has been carried normally. Then, in order not to allow the next original to be separated, the separation motor (M2) 80 is turned off. In order to feed the original to the carry path IIa, the signal M1FWD for the belt drive motor (M1) 82 is turned on to rotate the drive roller 7 in the direction of the arrow-→. While the leading edge of the original is fed in the space of the belt 8, it is waited until the trailing edge of the original is detected by the paper feed sensor (S2) 14 (step 103). When the trailing edge of the original is detected by the paper feed sensor (S2) 14, in order to stop the original at the predetermined position on the glass platen 12, a register counter RGCN1 operative upon reception of the clocks from the photo-electric sensor (BC) 95 is started. Every time one clock is received from the photo-electric sensor (BC) 95, the counter RGCN1 is incremented by one and the flow awaits until the counter RGCN1 ends (step 104). At the same time, every time one clock is counted, a motor deceleration subroutine SUB to be described later is executed to gradually decelerate the drive speed of the drive motor (M1) 82. When the counter RGCN1 ends, it is determined that the original has reached a position near the predetermined position on the glass platen 12. The electromagnetic brake (BK) 92 is turned on and the signals M1FWD and M1REV for the drive motor (M1) 82 are turned off to stop the driving of the belt immediately so that the original can be positioned with high accuracy. The carry motor (M3) 97 is also stopped by turning off the signal M3FWD therefor.

Upon this operation, one original is stopped at the predetermined position on the glass platen.

Figure 8B:
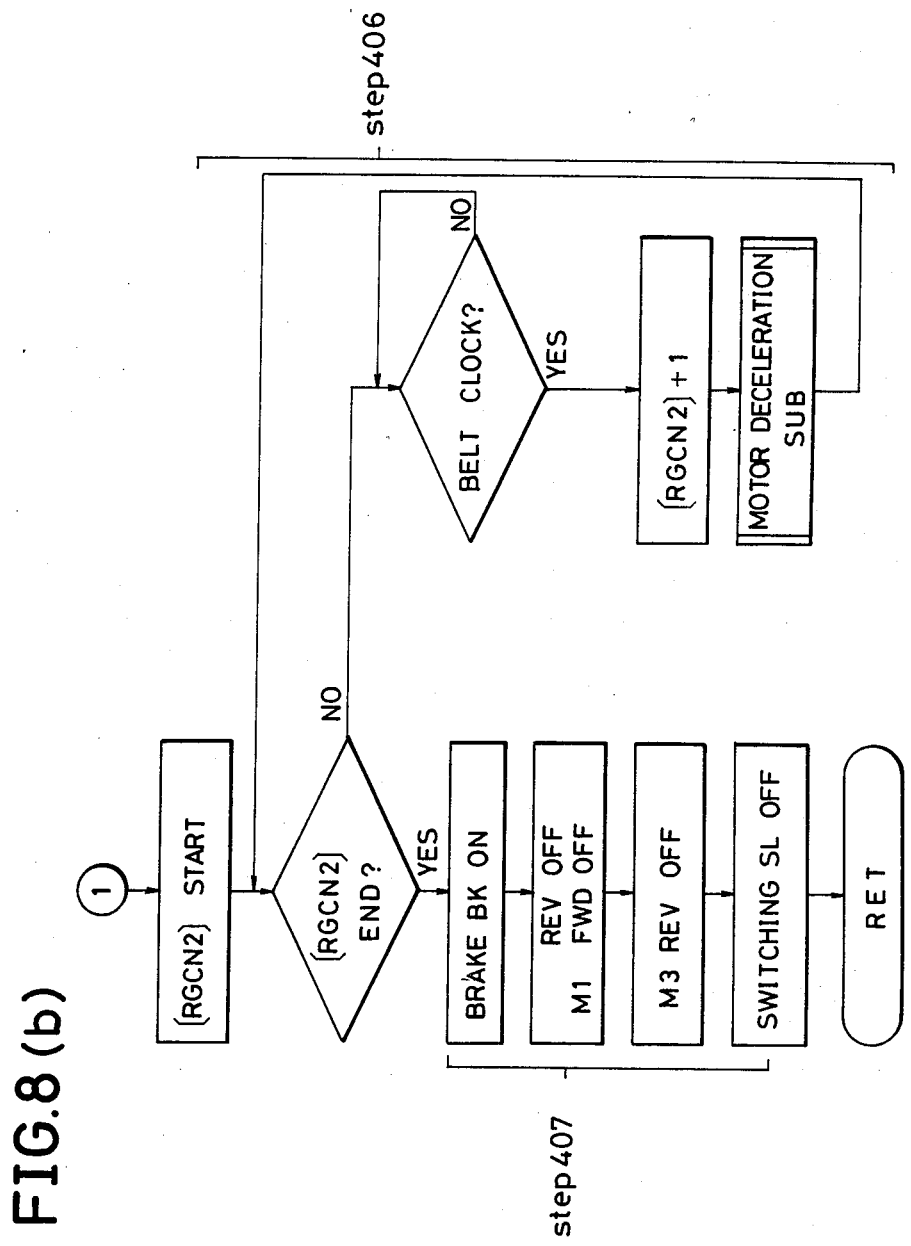

Referring to FIG. 8, the reverse feed subroutine SUB is performed as follows. In order to feed the original on the glass platen 12 to the carry paths IIIa to IVa, the switching solenoid (SL) 107 is turned off to move upward the switching pawl 23 and to switch the carry path. Then, the signal M1REV for the belt drive motor (M1) 82 is turned on to drive the belt roller 7 in the direction indicated by the solid arrow. The carry motor (M3) 97 is turned on (the signal M3REV is turned on) to rotate the carrier rollers 9 and 9a in the directions indicated by the dotted arrow. While the original is entered from the carry path IIIa to IVa, the original is fed until the reversal sensor (S4) 16 detects the trailing edge of the original (step 401). At the timing of the detection of the trailing edge, in order to turn off the belt drive motor (M1) 82 and the carry motor (M3) 97, the signal M1REV for the motor 82 and the signal M3REV for the motor 97 are turned off. The original is supported by the carrier rollers 9 and 9a. The trailing edge of the original in this state is at a position between the reversal sensor (S4) 16 and the carrier rollers 9 and 9a and the original waits until the time in a wait invertal timer ends (step 402). In order to reverse the carry direction of the original and to feed it to the carry paths Va and VIa, the carry rollers 9, 9a, 10, 10a, 11 and 11a are rotated in the direction indicated by the solid arrows by turning on the carry motor (M3) 97 (the signal M3FWD therefor). While the original enters from the carry path Va to the carry path VIa, the original is fed until the reversal sensor (S5) 17 detects the trailing edge of the original (step 403). When the trailing edge is detected, in order to turn off the carry motor (M3) 97, the signal M3FWD therefor is turned off. The original is supported by the rollers 10, 10a, 11, and 11a, and its trailing edge is positioned between the reversal sensor (S5) 17 and the rollers 10 and 10a. The original is stopped until the time in the interval timer ends (step 404).

Then, in order to reverse the carry direction of the original and to feed it to the carry paths VIIa to IIa, the carry rollers 10, 10a, 11, 11a, 6 and 6b are rotated in the directions indicated by the dotted arrows by turning on the carry motor (M3) 97, that is, the signal M3REV therefor. Furthermore, in order to drive the belt roller 7 in the direction of the solid arrow, the signal M1FWD therefor is turned on. While the leading edge of the original is fed into the belt 8, it is awaited until the trailing edge of the original is detected by the ejection or discharge sensor (S3) 15 in the carry path IIIa (step 405).

When the trailing edge is detected, in order to stop the original at the predetermined position on the glass platen 12, a register counter RGCN2 is started. The counter RGCN2 counts clocks from the photo-electric sensor 95. Every time one clock is counted by counter RGCN2, the motor deceleration subroutine SUB to be described below is executed, and the drive speed of the belt drive motor 82 is gradually reduced (step 406).

When the counter RGCN2 ends, it is determined that the original has reached a position near the predetermined position on the glass platen 12. The electromagnetic brake (BK) 92 is turned on, and at the same time the signal M1REV for the belt drive motor (M1) 82 is turned off. Then, the drive operation of the belt 8 is stopped, and the original is correctly positioned. The carry motor (M3) 97 is also stopped by turning off the signal M3REV therefor, and the switching solenoid (SL) 107 is turned off. Then, the original is reversed and is stopped at the predetermined position on the glass platen 12.

Figure 9:
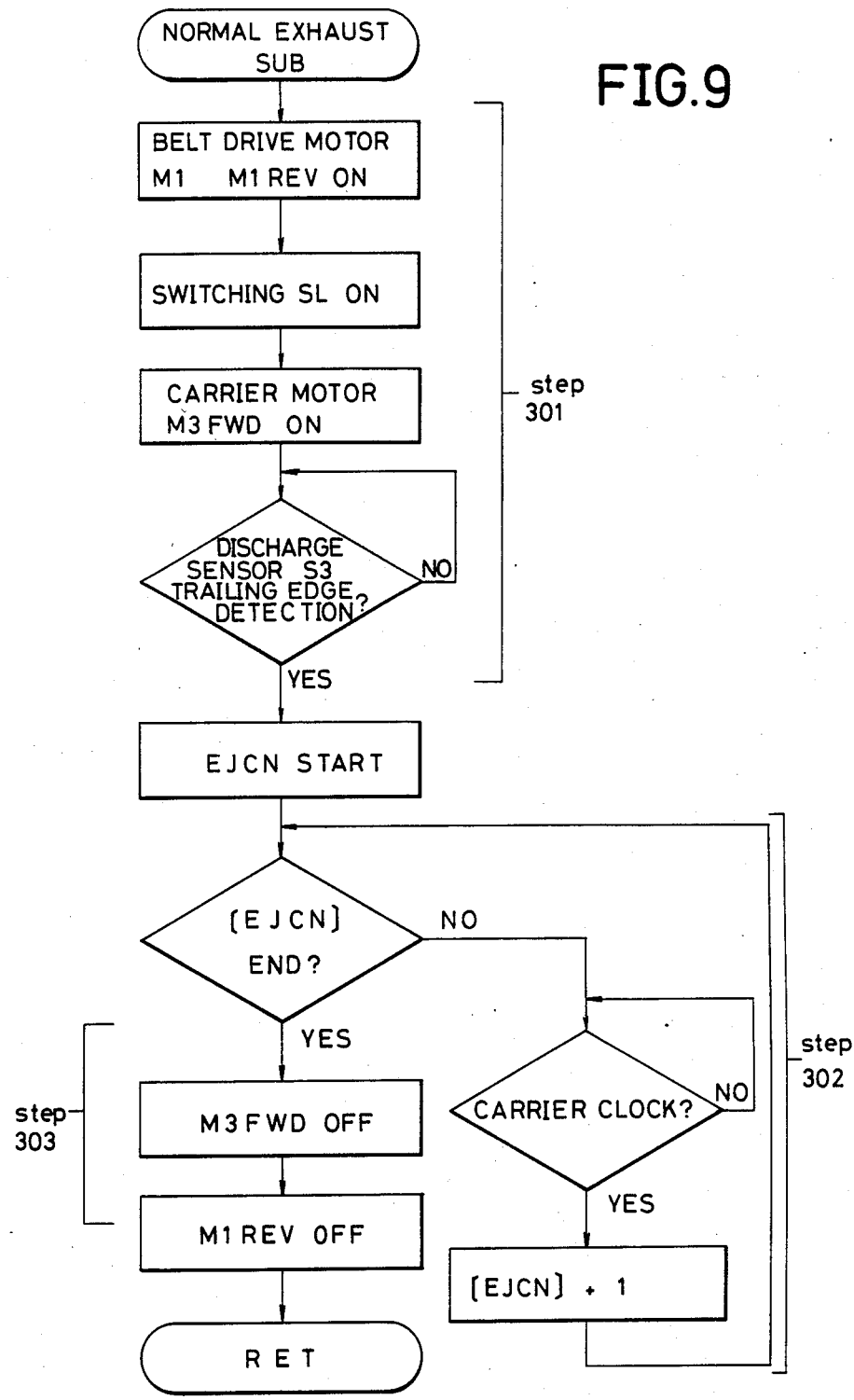

Referring to FIG. 9, the obverse ejection subroutine SUB is performed in the following manner. In order to rotate the belt roller 7 in the direction indicated by the dotted arrow and to feed the original on the glass platen 12 in the carry paths VIIa to VIa, the signal M1REV for the belt drive motor (M1) 82 is turned on. In order to turn on the carry rollers 6, 6b, 10, 10a, 11 and 11a and to drive them in the directions indicated by the arrows→, the signal M3FWD for the carry motor (M3) 97 is turned on and the solenoid (SL) 107 is turned on. When the original enters the carry path VIa, it is waited until the ejection sensor (S3) 15 detects the trailing edge of the original (step 301). When the trailing edge of the original is detected, an ejection counter EJCN is started. The clocks from the photo-electric sensor 105 are counted until the counter EJCN ends (step 302). When the counter EJCN ends, the original passes beyond the carry rollers 11 and 11a and is returned on the original table 1. The signal M3FWD for the motor (M3) 97 and the signal M1REV for the motor (M1) 82 are turned off to stop the drive operation, and the ejection is ended (step 303).

Figure 10:
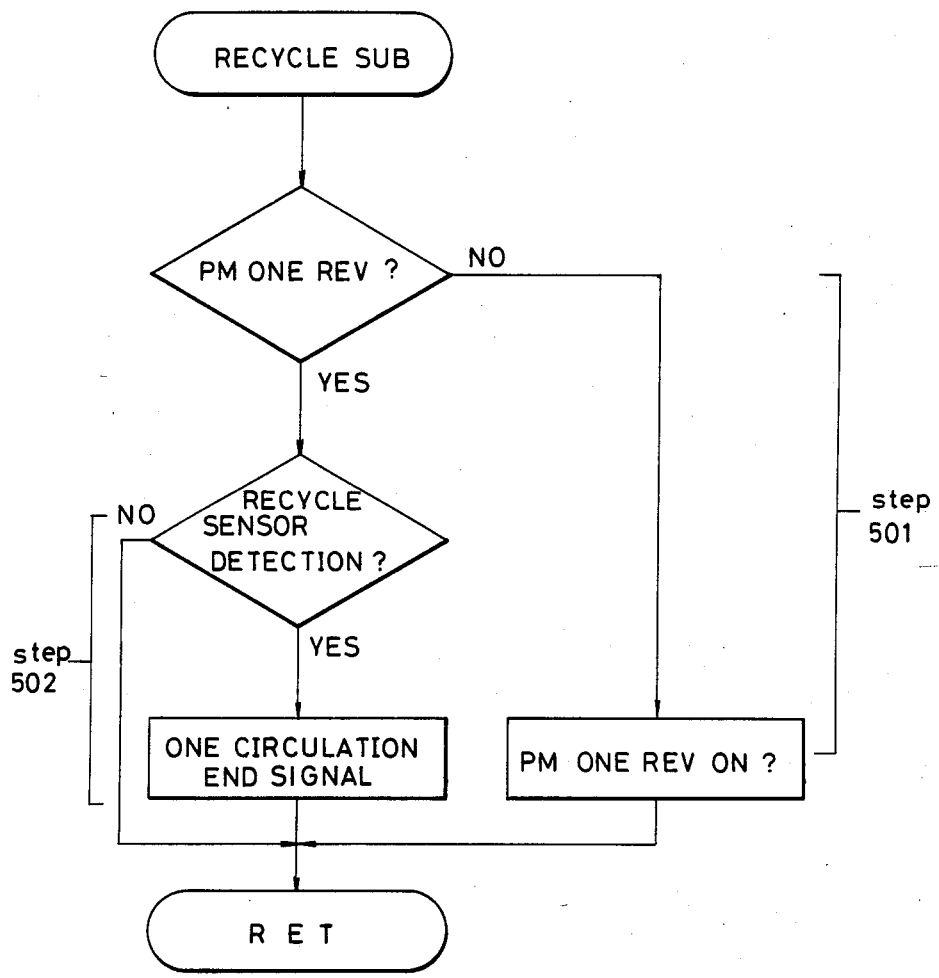

Referring to FIG. 10, the recycle subroutine SUB is performed in the following manner. When the original is stopped at the predetermined position on the glass platen 12, the pulse motor 21 is rotated once (step 501) to rotate the arm 22 onto the original bundle remaining on the original table 1. When one cycle is ended, the arm 22 is dropped by its own weight. When the turn on of the recycle sensor (RS) 19 is detected, a one cycle end signal is supplied to the copier (step 502).

One cycle of the original can be detected with high precision in this manner.

Figure 11:
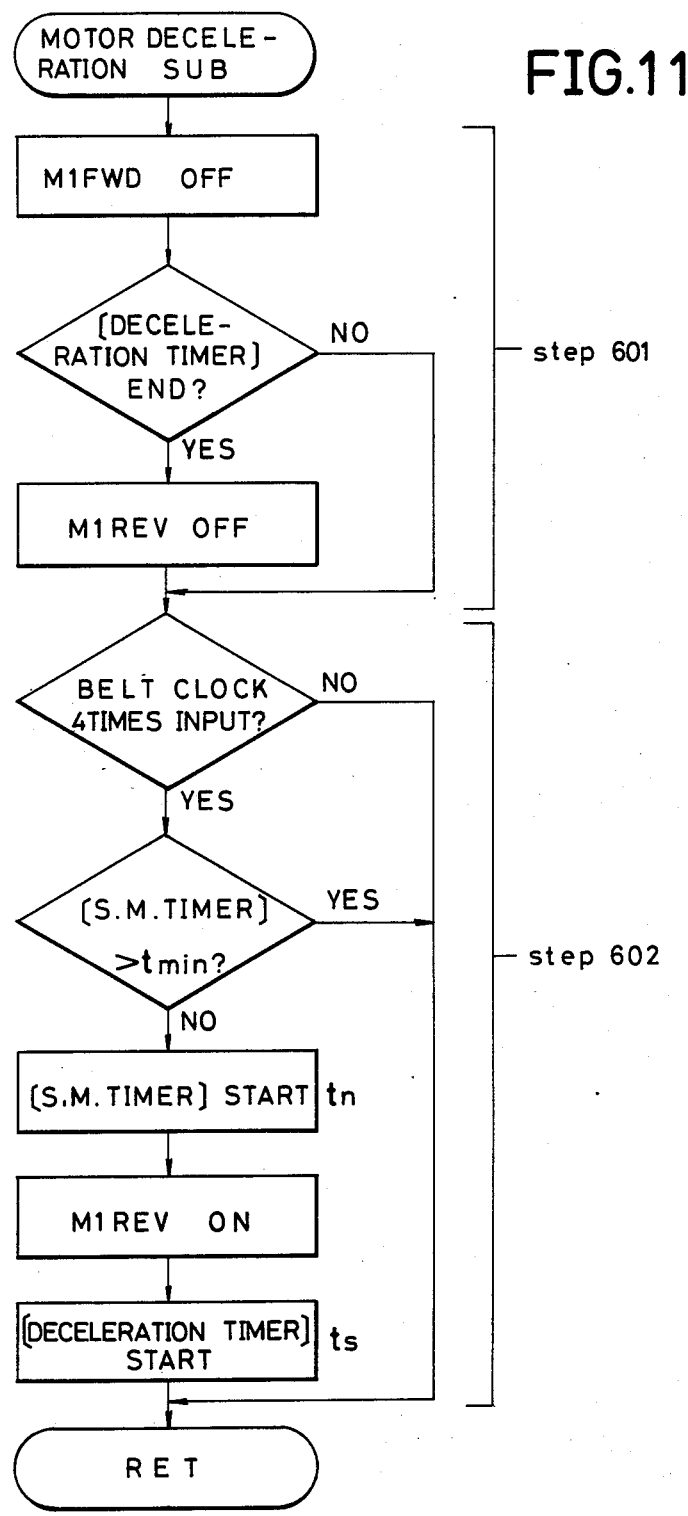

FIG. 11 shows details of the motor M1 deceleration subroutine SUB. The subroutine SUB is executed during an interval immediately after the detection of the trailing edge of the original until the stop of the original at the predetermined position of the glass platen 12. This time interval is counted by the counter RGCN1 or RGCN2. In order to decelerate the motor M1, the signal M1FWD therefor is turned off. It is checked if the deceleration timer to be described later has ended. If YES, the signal M1REV for the motor (M1) 82 is turned off to stop the deceleration. In this case, the deceleration of the motor M1 is performed by turning off the signal M1FWD and turning on the signal M1REV, that is, by rotating the motor in the reverse direction. When the deceleration timer is operated in the pulsed form, the motor is gradually decelerated (step 601). However, if the motor M1 is decelerated excessively, the motor M1 is stopped before the counter RGCN1 or RGCN2 is ended. Then, the original cannot be carried to the predetermined position on the glass platen 12. Therefore, damping control must be monitored such that excessive damping will not be performed. A period tn (t1, t2, . . .) in which four belt clocks are inputted is measured by a speed measuring timer. When the speed of the motor M1 is dropped, the time of the speed measuring timer is long. Therefore, a lower limit $t_{min}$ is set. When the time of the speed measuring timer is long, that is, when the speed of the motor M1 is lower than the lower limit, the deceleration is stopped, so that an erroneous carry operation as described above is monitored. When the speed is above the lower limit, the signal M1REV for the motor (M1) 82 is turned on to start the pulsed deceleration timer, such that the signal M1REV is turned on once upon counting every four belt clocks. In this manner, the speed of the motor M1 is gradually dropped (step 602).

FIG. 12 is a timing chart showing the deceleration operation when the motor deceleration subroutine (SUB) described above is performed. When the counter RNCN is started, the signal M1FWD is turned off. Since the time t1 corresponding to the four belt clocks is smaller than the lower limit $t_{min}$, the signal M1REV is turned on. In the second measurement, the time t2 is still smaller than the lower limit. It is therefore seen that the deceleration has been performed. The signal M1REV is then turned on. When the third measured time t3 becomes greater than the lower limit $t_{min}$, deceleration is stopped. The motor M1 is allowed to rotated at a speed corresponding to the inertia until the counter RGCN is ended. When the counter RGCN is ended, the electromagnetic brake (BK) is turned on and the motor is completely stopped.

FIGS. 13 to 15 are timing graphs showing the relationship between the motor speed and the time when the counter RGCN is counted from the detection of the trailing edge of the original to the stop of the original on the glass platen, and the same when the electromagnetic brake is turned on.

FIG. 13 shows a case wherein the signal M1FWD is kept on and no deceleration is performed until the counter RGCN ends, and the motor is stopped by the electromagnetic brake BK alone. In this case, the motor takes time T1 to completely stop. FIG. 14 shows a case of an embodiment of the present invention wherein the signal M1REV is not used. The signal M1FWD is turned off at the start of the counter RGCN. Until the counter RGCN ends, the motor is slowly decelerated by consuming the inertia by the friction or resistance of air or the like of each component. When the counter RGCN is ended, the electromagnetic brake (BK) 92 is turned on to stop the motor. In this case, the motor takes time T2 to completely stop.

FIG. 15 shows the case of the embodiment of the present invention described above. When the counter RGCN is started, the motor (M1) 82 is decelerated. When the speed is slowed down, the electromagnetic brake (BK) 92 is turned on to stop the motor. The motor takes time T3 to completely stop. In this case, it is apparent that T1>T2>T3. The stop time of the motor is influenced by the rise time of the electromagnet of the electromagnetic brake (BK) 92, the delay time of various operations such as the abutment of the friction plate or the like, and the like. The stop time also depends upon the sliding characteristics due to the speed difference when the brake is actuated. However, when the motor speed is small at the time of turning on of the brake, the sliding distance is small. Since the coupling speed is small, even if there are variations in the stop time of the brake, there are only small variations in stop time of the motor. Therefore, in this embodiment, the stop time tends not to vary.

As has been described above, in the original feeding apparatus of the present invention, the belt drive motor is gradually decelerated from a time before the stop time of the original on the glass platen. When the original comes to a position near the motor stop position, the carry operation is decelerated. When the original comes to the stop position, the belt drive mechanism is stopped by the electromagnetic brake. Even if there are variations in the operation time of the electromagnetic brake, the moving distance of the brake components upon turning on operation is minimized. Therefore, variations in the stop position of the original on the glass platen are reduced, and variations in the copy position of the image can also be reduced.

The original can also be stopped at the exposure position with an extremely good precision if the electrical brake and the electromagnetic brake for the motor are both applied so as to stop the original.

The original feed and stop operations in this case will be described below according to another embodiment of the present invention.

In the case of single side original copy, in the same manner as in the above embodiment, when the leading edge of an original fed from the original table 1 to the paper path Ia is detected by the sensor (S2) 14, the number of notched grooves 94 formed in the disk 93 (FIG. 2) starts to be counted. When a predetermined number of notched clocks 94 are counted, the motor (M1) 82 is turned off. At the same time, an electrical brake is actuated by a drive control circuit 130 of the motor (M1) 82. Then, the electromagnetic brake (BK) 92 is turned on, and a drive operation of the carry belt 8 is stopped immediately. Then, the original is automatically positioned at a predetermined position on the glass platen 12.

The ejection operation of the exposed original and the feed operation of the next original are the same as those of the first embodiment.

In the case of both side original copy, the obverse feed and reverse feed operations as described above with reference to the first embodiment are performed.

When the trailing edge of the original is detected by the sensor (S3) 15, the number of notched grooves 94 of the disk 93 (FIG. 2) starts to be counted. After a predetermined number of notched grooves 94 are counted, the motor (M1) 82 is turned off. At the same time, the electrical brake acts on the motor (M1) 82. Also the electromagnetic brake (BK) 92 is turned on. The drive operation of the carry belt 8 is immediately stopped, and the original is set in position.

Since the subsequent operation is the same as that of the first embodiment, it will not be described.

Figure 16:
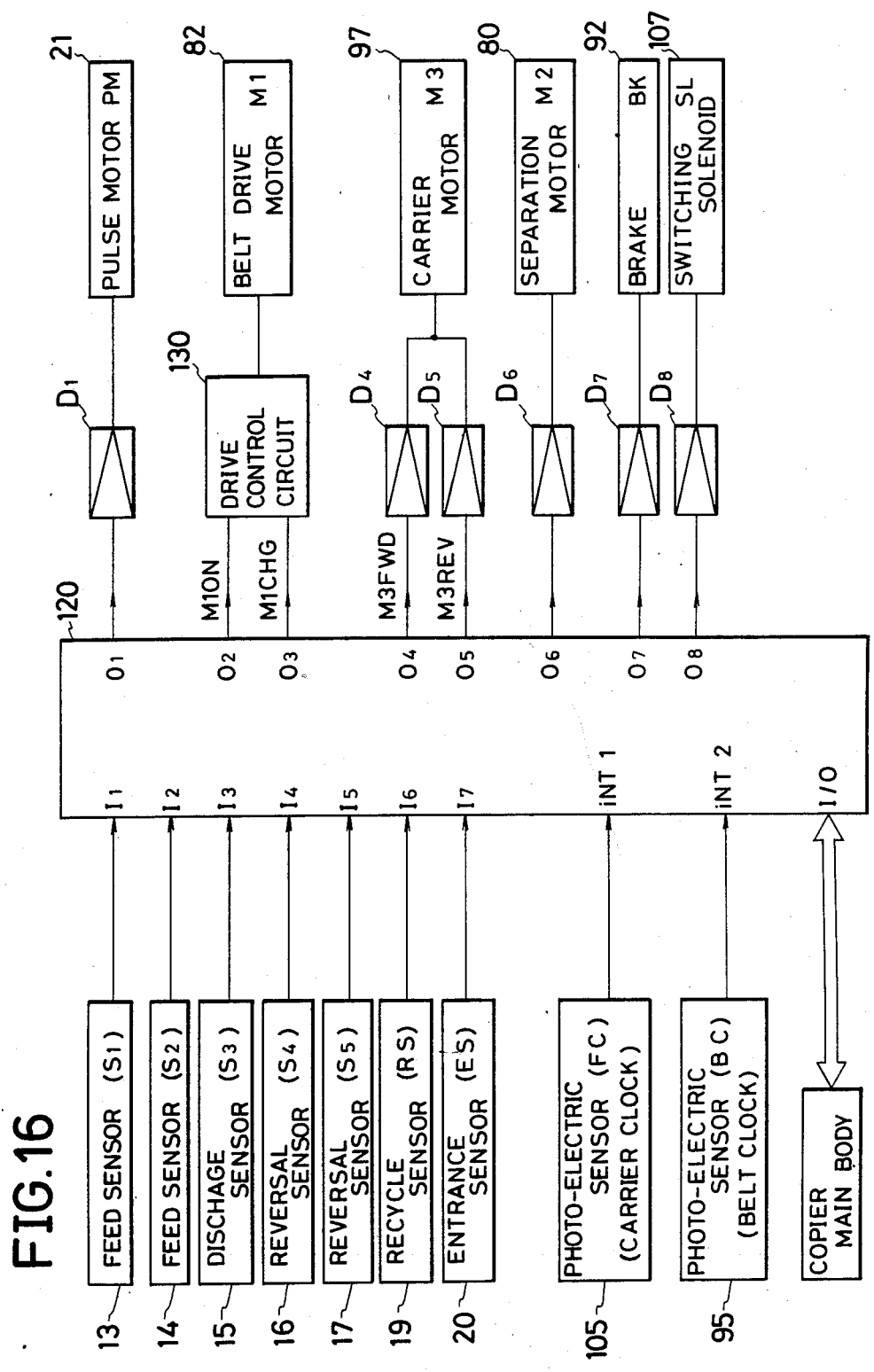
FIG. 16 is a block diagram of a control section according to another embodiment of the present invention.

FIG. 16 is a block diagram of a control section for performing the above sequence of the second embodiment. The same reference numerals as in FIG. 4 denote the same parts in FIG. 16. The circuit shown in FIG. 16 is different from that shown in FIG. 4 in that the drive control circuit 130 is connected to the output ports O2 and O3 so as to perform the reversal of the drive direction of the belt drive motor (M1) 82 and to perform the electrical brake control.

Figure 17:
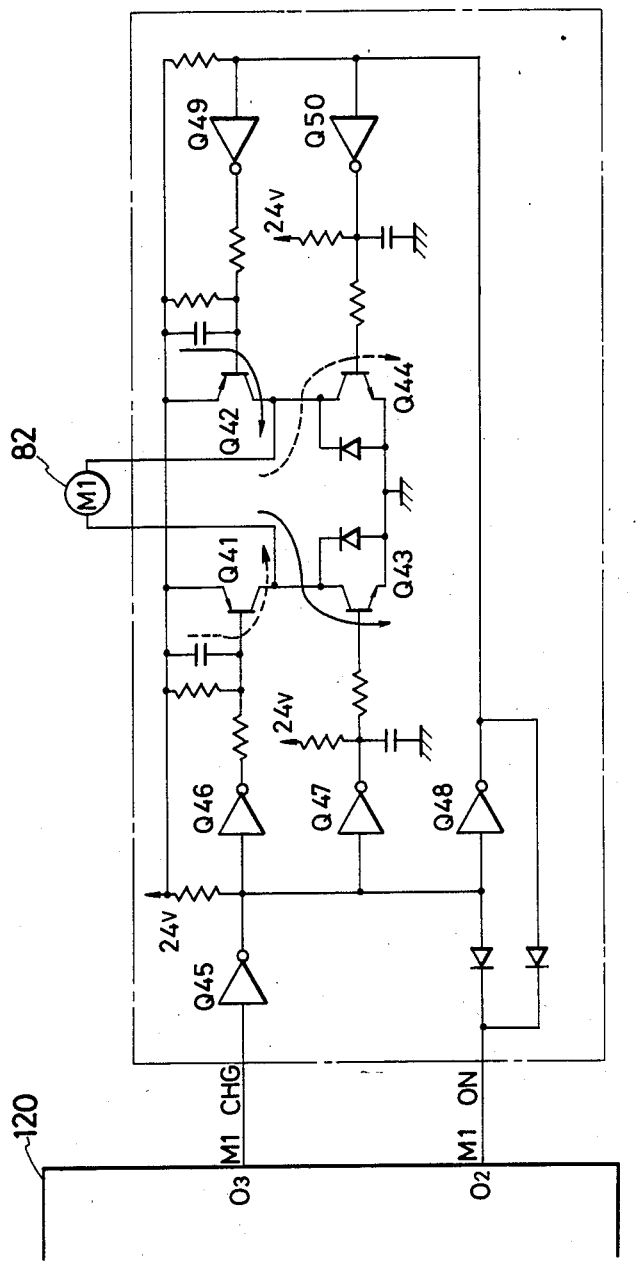
FIG. 17 is a circuit diagram of a drive control circuit for a belt drive motor of the apparatus shown in FIG. 16.

FIG. 17 is a circuit diagram showing details of the circuit for controlling the drive operation of the belt drive motor (M1) 82.

Referring to FIG. 1, in order to drive the motor (M1) 82 in the direction indicated by the arrow→(to be referred to as forward drive hereinafter), the output port O3 of the μ-COM 120 produces a signal M1CHG="H"

and the output port O2 produces a signal M1ON="H". When M1CHG="H", the output from an inverter Q45 goes low ("L"). The output from an inverter Q46 is "H", a transistor Q41 is turned off, and the output from an inverter Q47 is "H", so that a transistor Q43 is turned on. When M1ON ="H", the output from an inverter Q48 is "H". The output from an inverter Q49="L", a transistor Q42 is turned on, the output from an inverter Q50 is "L", and a transistor Q44 is turned off. Thus, a current flows in the direction of the arrow→and the motor (M1) 82 is driven in the forward direction.

When the motor (M1) 82 is to be driven in the direction indicated by the arrow—referring to FIG. 1 (to be referred to as reverse drive hereinafter), the μ-COM 120 produces the signal M1CHG="L" and the signal M1ON="H". When the signal M1CHG is "L", the output from the inverter Q45 is "H", and the output from the inverter Q46 is "L". The transistor Q41 is turned on, the output from the inverter Q47 is "L", and the transistor Q43 is turned off. When the signal M1ON="H", the output from the inverter Q48 is "L". The output from the inverter Q49 is "H", and the transistor Q42 is turned off. The output from an inverter Q50 is "H", and the transistor Q44 is turned on. As a result, the current flows in the direction of the arrow—, and the motor (M1) 82 is driven in the reverse direction.

When the electrical brake is to be operated to brake the motor (M1) 82, the level of the signal M1ON is kept at "L" level irrespective of the level of the signal M1CHG. Then, the input to the inverter Q48 is "1" and the output from the inverter Q48 is "L". The output from the inverter Q46 is "H", and the transistor Q41 is turned off. The output from the inverter Q47 is "H", and the transistor Q43 is turned on. The output from the inverter Q49 is "H" and the transistor Q42 is turned off. The output from the inverter Q50 is "H", and the transistor Q44 is turned on. Therefore, the two ends of the motor (M1) 82 are grounded, so that the motor (M1) 82 is braked by the electrical brake and immediately stops.

The mode of operation of the RDF according to this embodiment will be described below. Since the general flow chart for the single side original copy and the general flow chart for the both side original copy are the same as those shown in FIG. 7, a description thereof will be omitted.

Figure 18:
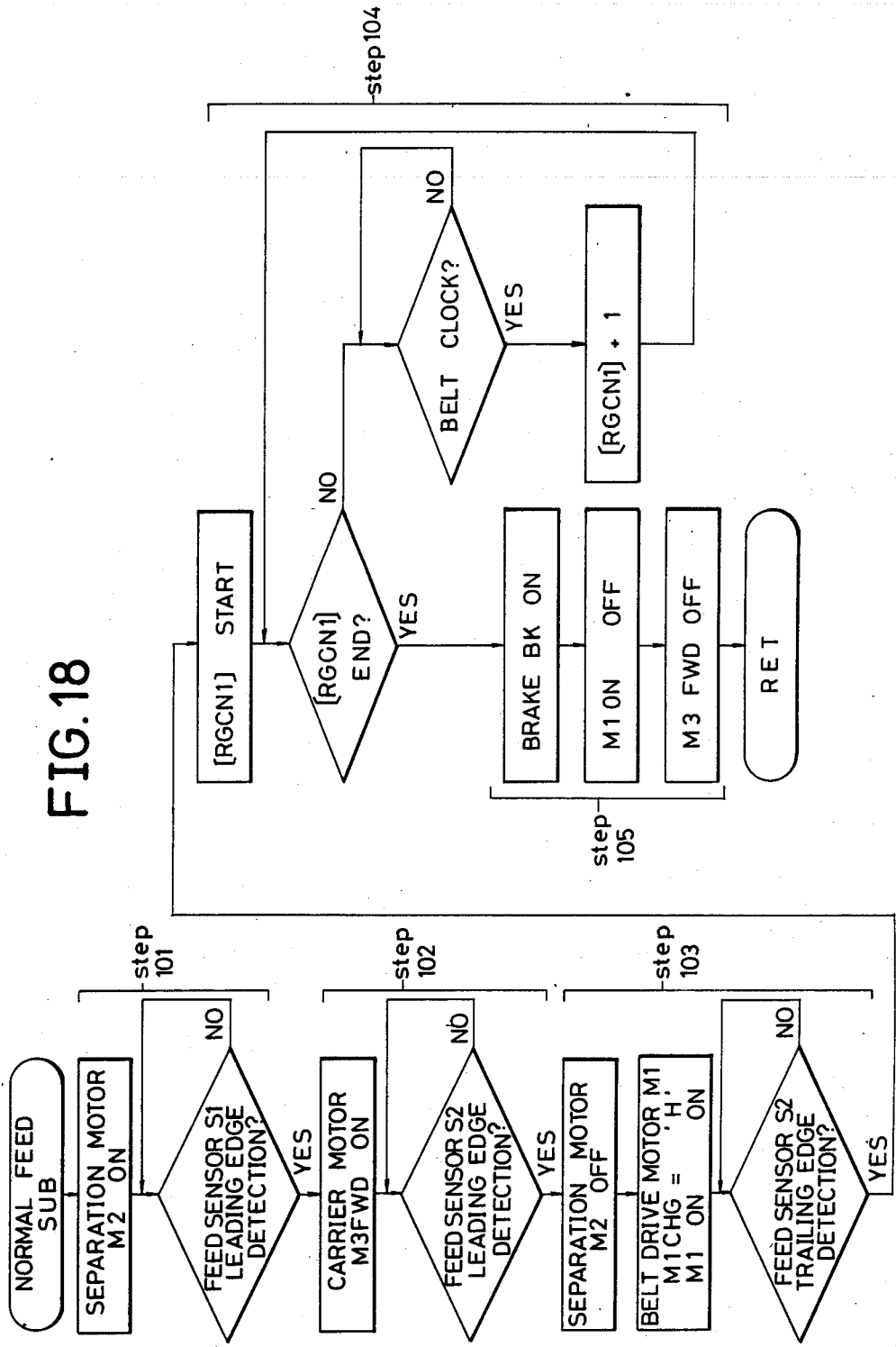
FIGS. 18 to 20 are flow charts showing details of the subroutines in the apparatus shown in FIG. 16.

The details of each subroutine in this embodiment will be described. Referring to FIG. 18, the obverse feed subroutine SUB is performed in the following manner. In order to separate the lowermost original of the original bungle placed on the original table 1, the separation motor (M2) 80 is turned on. It is then waited until the leading edge of the original reaches the paper feed sensor (S1) 13 arranged at the upstream side of the carry rollers 6 and 6a (step 101). In order to feed the original separated in this manner to the carry path Ia by the carry rollers 6 and 6a, a signal M3FWD is turned on to rotate the carry rollers 6 and 6a in the direction of the solid arrow. It is then waited until the leading edge of the original reaches the paper feed sensor (S2) 14 between the carry rollers 6 and 6a and the belt roller 7 (step 102). When the leading edge is thus detected, it is determined that the original has been normally carried. In order not to allow the next original to be separated, the separation motor (M2) 80 is turned off. In order to feed the original to the carry path IIa, the belt drive motor (M1) 82 is turned on. In order to drive the belt roller 7 in the direction of the arrow→, the output signal M1CHG from the μ-COM 120 is kept at "H" level. While the leading edge of the original is fed in the belt 8, it is waited until the trailing edge of the original is detected by the paper feed sensor (S2) 14 (step 103). When the trailing edge of the original is detected by the paper feed sensor (S2) 14, in order to stop the original at the predetermined position on the glass platen 12, the register counter RGCN1 counting the clocks from the photo-electric sensor (BC) 95 is started. Every time a clock from the sensor (BC) 95 is counted, the count of the counter RGCN1 is incremented by one. It is then waited until the counter RGCN1 is ended (step 104). When the counter RGCN1 ends, it is determined that the original has reached a position near the predetermined position on the glass platen 12. The electromagnetic brake (BK) 92 is turned on, and at the same time the signal M1ON is turned off so as to apply an electrical brake on the belt drive motor (M1) 82. Then, as will be described below, the belt drive is immediately stopped, and correct original positioning is performed. The signal M3FWD is also turned off so as to turn off the carry motor (M3) 97.

Upon this operation, one original is stopped at the predetermined position on the glass platen 12.

Figure 19A:
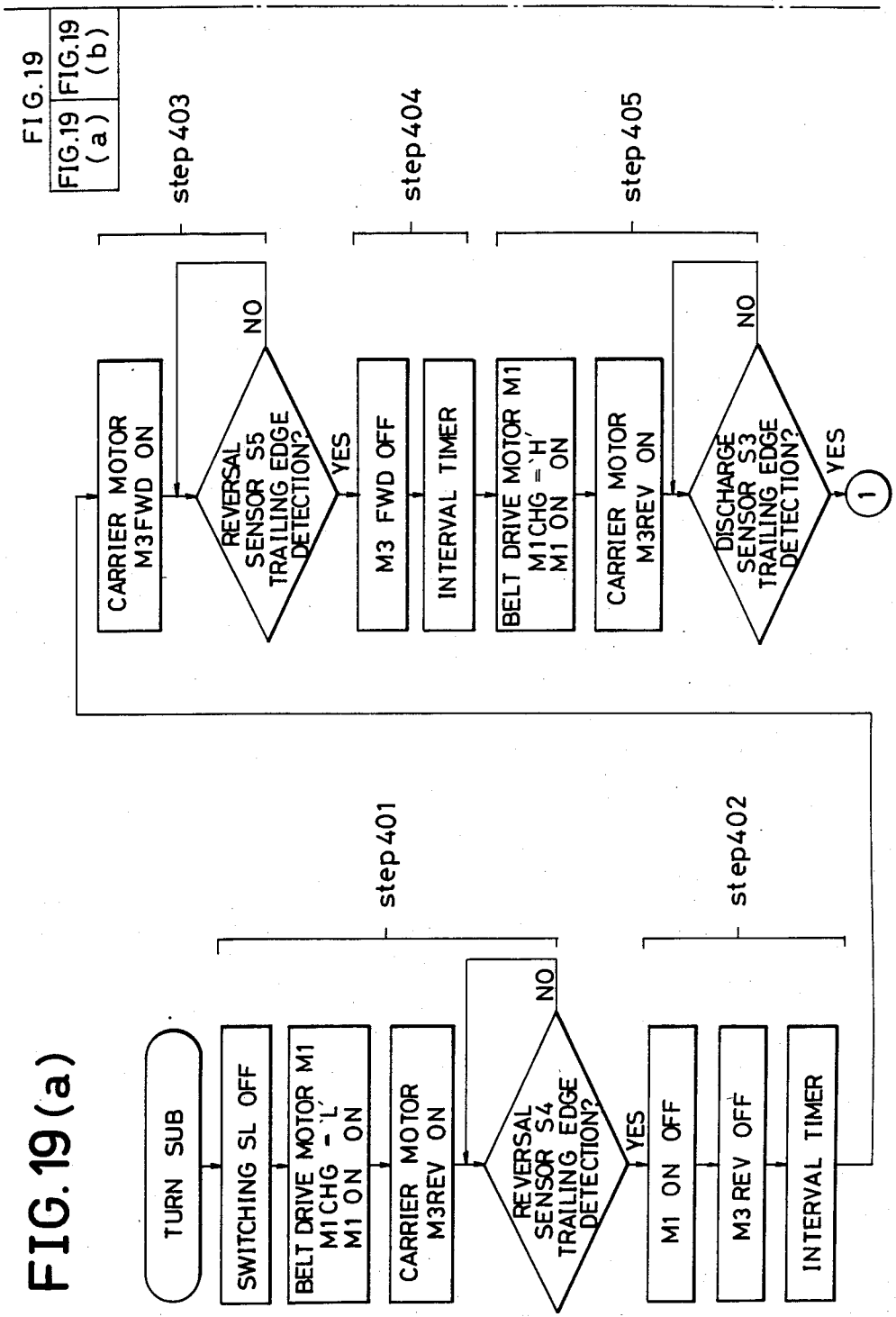
Figure 19B:
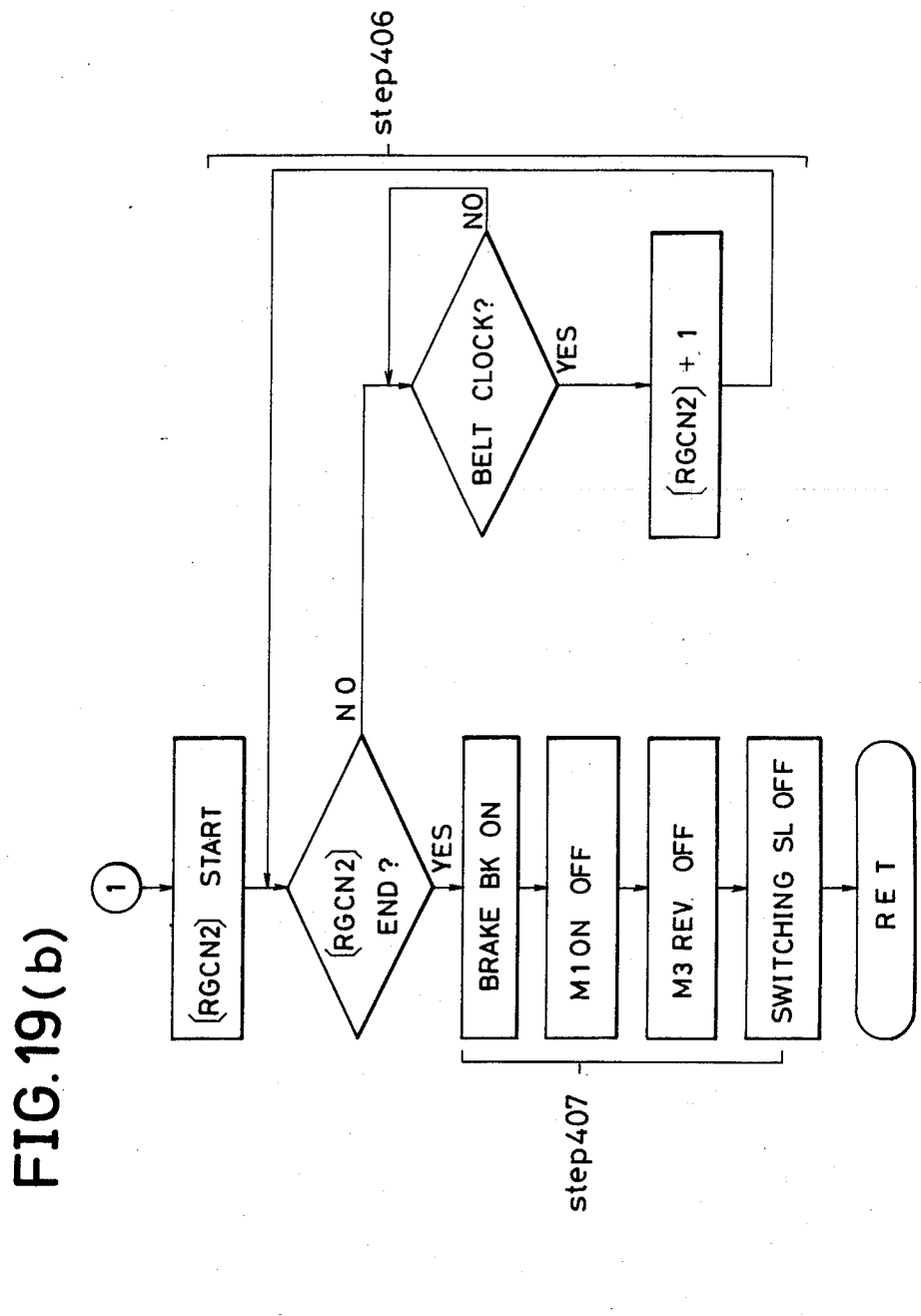

Referring to FIG. 19, the reverse feed subroutine SUB is performed in the following manner. In order to feed the original on the glass platen 12 into the carry paths IIIa to IVa, the switching solenoid (SL) 107 is turned off to move the switching pawl 23 upward and to switch the carry path. Then, in order to rotate the carry belt roller 7 in the direction indicated by the dotted line, the belt drive motor (M1) 82 is turned on, that is, the signal M1CHG is kept at "L" level and the signal M1ON is turned on. In order to rotate the carry rollers 9 and 9a in the direction of the dotted arrow, the carry motor (M3) 97 is turned on, that is, the signal M3REV is turned on. While the original enters from the carry path IIIa to the carry path IVa, the original is kept carried until the trailing end of the original is detected by the reversal sensor (S4) 16 (step 401). When the trailing end of the original is detected, in order to turn off the belt drive motor (M1) 82 and the carry motor (M3) 97, the signal M1ON is turned off and the signal M3REV is turned off. The original is supported by the carry rollers 9 and 9a, and its trailing end is supported between the reversal sensor (S4) 16 and the carry rollers 9 and 9a. The original waits until the wait interval timer ends (step 402'). In order to reverse the feeding direction of the original and to feed the original to the carry paths Va and VIa, the carry rollers 9, 9a, 10, 10a, 11 and 11a are rotated in the direction indicated by the solid arrows by turning on the carry motor (M3) 97, that is, the signal M3FWD. When the original enters from the carry path Va to the carry path VIa, the original is fed until the trailing edge of the original is detected by the reversal sensor (S5) 17 (step 403). When the trailing edge of the original is detected, in order to turn on the carry motor (M3) 97, the signal M3FWD is turned off. The original is supported by the carry rollers 10, 10a, 11 and 11a. The trailing edge of the original is placed between the reversal sensor (S5) 17 and the carry rollers 10 and 10a and the original waits until the interval timer ends (step 404).

In order to reverse the feeding direction of the original and to feed the original to the carry paths VIIa to IIa, the carry rollers 10, 10a, 11, 11a, 6 and 6b are rotated in the directions of the dotted arrows by turning on the carry motor (M3) 97, that is, by turning on the signal M3REV. In order to rotate the carry belt roller 7 in the direction indicated by the solid arrow, the belt drive motor (M1) 82, that is, the signal M1CHG is kept at "H" and the signal M1ON is turned on. While the leading edge of the original is fed into the belt 8, it is waited until the trailing edge of the original is detected by the ejection sensor (S3) 14 (step 405').

When the trailing edge is detected, in order to stop the original at the predetermined position on the glass platen 12, the register counter RGCN2 is started. The counter RGCN2 counts the clock pulses from the photo-electric sensor 95 (step 406'). When the counter RGCN2 ends, it is determined that the original has reached a position near the predetermined position on the glass platen 12. Then, the electromagnetic brake (BK) 92 is turned on. At the same time, in order to apply an electrical brake on the belt drive motor (M1) 82, the signal M1ON is turned off. Then, the drive operation of the belt 8 is stopped, and the original is correctly positioned. The drive of the carry motor (M3) 97 is stopped by turning off the signal M3REV, and the switching solenoid (SL) 107 is turned off. Upon this operation, the original can be reversed and can be placed at the predetermined position on the glass platen 12.

Figure 20:
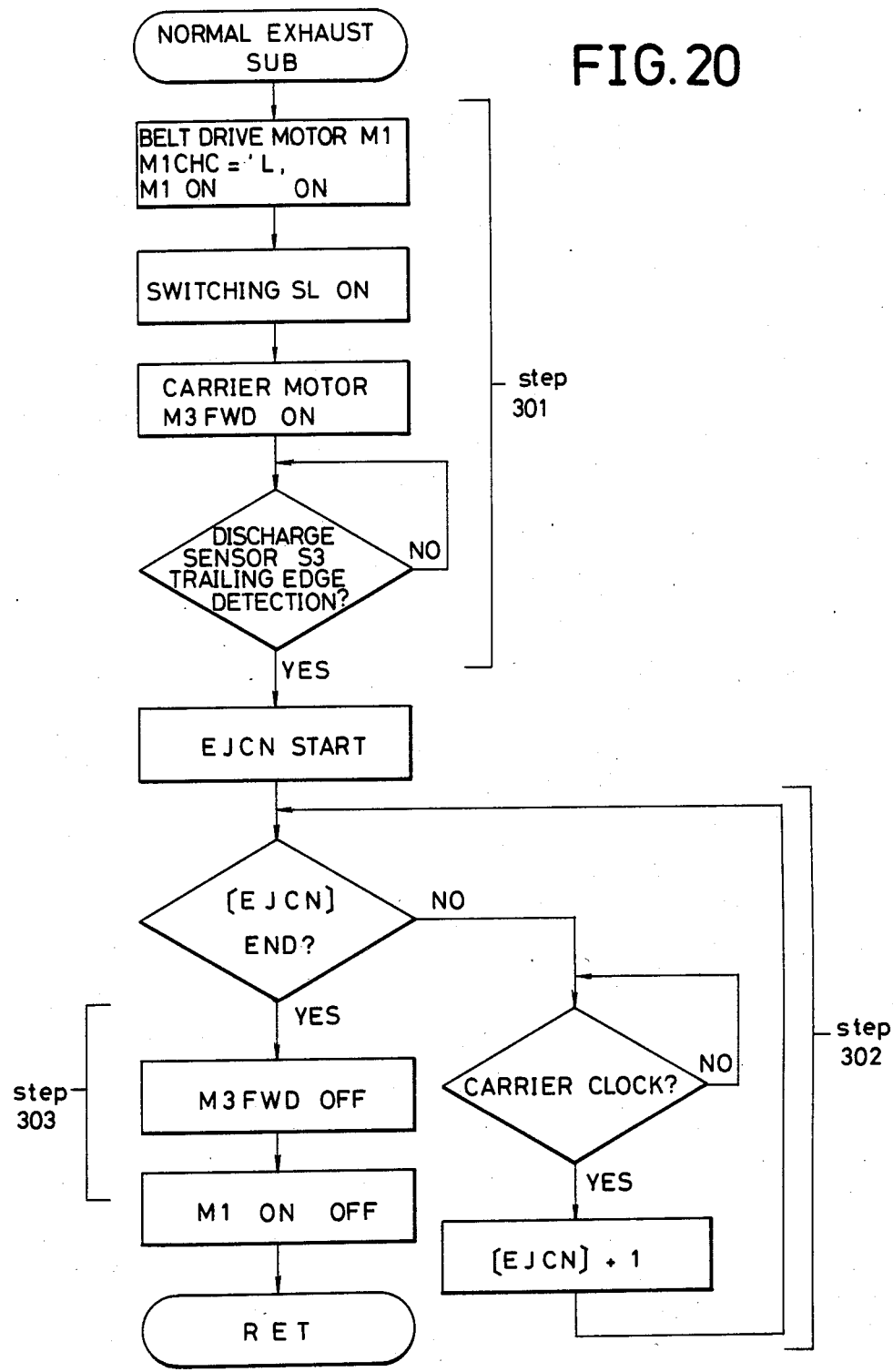

Referring to FIG. 20, the obverse ejection subroutine SUB is performed in the following manner. In order to rotate the carry belt roller 7 in the direction indicated by the dotted arrow and to feed the original on the glass platen 12 to the carry paths VIIa to VIa, the belt drive motor (M1) 82 is turned on. That is, the signal M1CHG is kept at "L" and the signal M1ON is turned on. In order to drive the carry rollers 6, 6b, 10, 10a, 11 and 11a in the direction of the arrow→, the carry motor (M3) 97 is turned on, that is, the signal M3FWD is turned on. At the same time, the solenoid (SL) 107 is turned on. While the original is in the carry path VIa, it is waited until the trailing edge of the original is detected by the ejection sensor (S3) 15 (step 301'). When the trailing edge is detected, the ejection counter EJCN is started. The counter EJCN counts the clock signals from the photo-electric sensor 105 (step 302'). When the counter EJCN ends, the original has passed through the carry rollers 11 and 11a and has been returned on the original bundle on the original table 1. The signal M3FWD is turned off and the signal M1ON is turned on to stop driving the motor (M1) 82 so as to complete the original discharge or ejection (step 303').

Since the recycle subroutine SUB is the same as that described with reference to FIG. 10, a description thereof will be omitted.

FIGS. 21 to 23 show the delay times from the time of turning off of the belt drive motor (M1) 82 by the output from the μ-COM 120 to the actual stop time of the original on the glass platen 12 when the original is to be stopped at the predetermined position on the glass platen 12 in accordance with this embodiment of the present invention. FIG. 21 corresponds to a case wherein the electrical brake is applied on the belt drive motor (M1) 82. In this case, the belt 8 takes time T1 to completely stop. FIG. 22 corresponds to a case wherein the belt 8 is still subject to the inertia force upon turning off of the belt drive motor (M1) 82, and the electromagnetic brake (BK) 92 is turned on. In this case, the belt 8 takes time T2 to completely stop. This is due to a delay time T2' attributed to the mechanical portion of the electromagnetic brake. An actual stop time (T2−T2') is caused by the sliding corresponding to the speed when the electromagnetic brake is actuated. FIG. 23 corresponds to a case wherein the electrical brake is applied by turning off the belt drive motor (M1) 82, and the electromagnetic brake (BK) 92 is coupled when the belt drive motor is slowed down during the actuation delay of the electromagnetic brake (BK) 92. Thus the sliding amount becomes small and the belt stops at time T3. The conditions T3<T2 and T3<T1 are established. Variations in the stop time by the sliding of the electromagnetic brake (BK) 92 are reduced, so that the original can be stopped at the predetermined position.

FIG. 24 shows still another embodiment of the present invention. In this embodiment, the driving of the electromagnetic brake (BK) 92 is performed by the outputs from output ports O7 and O7' of the μ-COM 120 through drivers D5 and D5'. The driver D5 applies the rating power (to be referred to as BK hereinafter) to the electromagnetic brake (BK) 92, and the driver D5' applies power over the rating power (to be referred to as BKOVER), for example, power twice the rating power to the electromagnetic brake (BK) 92. FIG. 25 shows a drive timing of the brake 92. The power BKOVER is supplied in a pulse form and then the brake 92 is continuously driven so as to improve the response speed of the brake 92. After the electromagnetic brake 92 is coupled, the brake 92 is driven by the rating power. As a result, as shown in FIG. 26, coupling time T2" of the electromagnetic brake (BK) 92 is short together with the force of the belt drive motor (M1) 82. Therefore, the original can be stopped within a short period of time.

In this embodiment, the electromagnetic brake (BK) 92 and the electrical brake of the belt drive motor (M1) 82 are applied simultaneously. However, in a still another embodiment, a similar precision can be obtained if the electromagnetic brake (BK) 92 is applied and the electrical brake of the belt drive motor (M1) 82 is applied in the coupling time of the brake (BK) 92. It is also possible to apply the electromagnetic brake after applying the electrical brake.

In this manner, according to an original feeding apparatus of the present invention for carrying an original, stopping the original at a predetermined position, and performing an exposure and ejection of the original, the electrical brake of a belt drive motor and the electromagnetic brake of the belt drive motor are applied when the original is to be stopped at the predetermined position on the glass platen. Therefore, the time for the original to stop after application of a stop signal can be shortened. Therefore, variations in the stop position of the original can be reduced, and variations in the copy position on sheets can be also reduced. A similar effect can be obtained even if the carry speed of the original is increased.

In the above embodiments, the counter for stopping the carry operation of the original is started when the trailing edge of the original is detected. However, the counter can be started when the leading edge of the original is started.

The present invention is not limited to the particular embodiments described above, and various other changes and modifications may be made within the spirit and scope of the present invention.

What is claimed is:
1. An original feeding apparatus comprising:
carrying means for carrying an original to a predetermined position;
drive means for driving said carrying means;
decelerating means for decelerating a drive speed of said driven means;

stop means for stopping an operation of said carrying means; and control means for sequentially actuating said decelerating means and said stop means so that the original is stopped at the predetermined position, said control means being adapted to actuate said decelerating means so as to decelerate the drive speed of said driving means, and to actuate said stop means after a predetermined delay, wherein said control means stops an operation of said decelerating means when the drive speed becomes smaller than a predetermined speed.

2. An apparatus according to claim 1, wherein said declerating means gradually decelerates the drive speed of said drive means by intermittently rotating said drive means in opposite directions.

3. An apparatus according to claim 1, wherein said control means has counting means for counting for a predetermined period of time from a predetermined timing, and said control means actuates said decelerating means at the predetermined timing and actuates said stop means when said counting means ends counting.

4. An apparatus according to claim 3, wherein said control means stops a drive operation of said drive means in a forward direction at the predetermined timing.

5. An apparatus according to claim 3, wherein said carrying means has detecting means for detecting the original placed at a predetermined position on an original carry path, and the predetermined timing is a timing at which said detecting means detects an edge of the original.

6. An apparatus according to claim 5, wherein the edge of the original is a trailing edge of the original.

7. An apparatus according to claim 1, wherein said stop means has an electromagnetic brake.

8. An original feeding apparatus comprising:
carrying means for carrying an original to a predetermined position;
drive means for driving said carrying means;
transmission means for transmitting the driving force of said drive means to said carrying means;
first stop means for applying an electrical brake on said drive means in the condition that the driving force is transmitted by said transmission means to said carrying means;
second stop means for stopping an operation of said carrying means; and
control means for simultaneously actuating both said first and second stop means in a predetermined timing after driving initiation of said drive means.

9. An apparatus according to claim 8, wherein said drive means has a motor, and said first stop means applies the electrical brake by short-circuiting two ends of said motor.

10. An apparatus according to claim 9, wherein said control means has counting means for counting a predetermined period of time so as to stop the original at the predetermined position, and the predetermined timing is an operation end timing of said counting means.

11. An apparatus according to claim 10, wherein said carrying means has detecting means for detecting the original at a predetermined position on an original carry path, and said control means starts said counting means when said detecting means detects an edge of the original.

12. An apparatus according to claim 11, wherein the edge of the original is a trailing edge of the original.

13. An apparatus according to claim 8, wherein said second stop means has an electromagnetic brake.

14. An apparatus according to claim 13, wherein said control means applies power over rating power to said electromagnetic brake to pulse drive said electromagnetic brake and then applies the rating power to said electromagnetic brake to continuously drive said electromagnetic brake when the original is to be stopped.

15. An apparatus according to claim 8, wherein said control means actuates said second stop means and then actuates said first stop means.

16. An original feeding apparatus comprising:
carrying means for carrying an original to a predetermined position;
drive means for driving said carrying means;
decelerating means for gradually decelerating a drive speed of said drive means by means of intermittently rotating said drive means in opposite directions;
stop means for stopping an operation of said carrying means; and
control means for sequentially actuating said decelerating means and said stop means so that the original is stopped at the predetermined position, said control means being adapted to actuate said decelerating means so as to decelerate the drive speed of said driving means, and to actuate said stop means after a predetermined delay.

* * * * *

UNITED STATES PATENT AND TRADEMARK OFFICE
CERTIFICATE OF CORRECTION

PATENT NO. : 4,667,951

DATED : May 26, 1987

INVENTOR(S) : TAKESHI HONJO, ET AL.

It is certified that error appears in the above-identified patent and that said Letters Patent is hereby corrected as shown below:

AT [57] IN THE ABSTRACT

Line 3,    "position" should read --position on--.

Line 8,    "position," should read --precision,--.

SHEET 13 OF 19 OF THE DRAWING FIGURES

FIG.16,   "DISCHAGE   " should read --DISCHARGE --.
                 SENSOR                           SENSOR

COLUMN 1

Line 35,   "has its" should read --has as its--.

COLUMN 7

Line 31,   "invertal" should read --interval--.

COLUMN 9

Line 25,   "rotated" should read --rotate--.

COLUMN 11

Line 50,   "bungle" should read --bundle--.

UNITED STATES PATENT AND TRADEMARK OFFICE
CERTIFICATE OF CORRECTION

PATENT NO. : 4,667,951

DATED : May 26, 1987

INVENTOR(S) : TAKESHI HONJO, ET AL.

It is certified that error appears in the above-identified patent and that said Letters Patent is hereby corrected as shown below:

COLUMN 14

Line 32, "a" should be deleted.
Line 57, "started." should read --detected.--.
Line 68, "driven" should read --drive--.

COLUMN 15

Line 14, "declerating" should read --decelerating--.

Signed and Sealed this

Nineteenth Day of January, 1988

Attest:

DONALD J. QUIGG

*Attesting Officer*     *Commissioner of Patents and Trademarks*